United States Patent [19]

Sekiguchi et al.

[11] Patent Number: 5,926,089
[45] Date of Patent: Jul. 20, 1999

[54] ELECTRIC POWER SYSTEM PROTECTION AND CONTROL SYSTEM AND DISTRIBUTED CONTROL SYSTEM

[75] Inventors: Katsuhiko Sekiguchi; Michio Masui, both of Tokyo, Japan

[73] Assignee: Kabushikik Kaisha Toshiba, Kawasaki, Japan

[21] Appl. No.: 08/982,352

[22] Filed: Dec. 2, 1997

[30] Foreign Application Priority Data

Dec. 3, 1996 [JP] Japan .................................. P08-337647

[51] Int. Cl.$^6$ .................................................. G08B 23/00
[52] U.S. Cl. ............... 340/500; 340/825.06; 340/825.22; 364/138; 364/146; 364/188
[58] Field of Search .............................. 340/500, 825.06, 340/825.22, 825.5, 525; 364/138–141, 146, 188; 706/10, 50

[56] References Cited

U.S. PATENT DOCUMENTS

| | | | |
|---|---|---|---|
| 5,657,448 | 8/1997 | Wadsworth et al. ..................... | 395/652 |
| 5,680,645 | 10/1997 | Russell et al. .......................... | 395/868 |
| 5,696,695 | 12/1997 | Ehlers et al. ............................ | 364/492 |
| 5,812,826 | 9/1998 | McLain, Jr. ............................. | 395/500 |

*Primary Examiner*—Donnie L. Crosland
*Attorney, Agent, or Firm*—Oblon, Spivak, McClelland, Maier & Neustadt, P.C.

[57] ABSTRACT

An electric power system protection and control system including a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. Each of the protection controllers includes a core area not directly connected to the communication network for executing the protection and control of the electric power system, and a web area for sending and receiving a program module to and from the display controller and another one of the protection controllers or sending an information in the core area to the program module via the communication network, respectively.

27 Claims, 21 Drawing Sheets

5,926,089

ELECTRIC POWER SYSTEM PROTECTION AND CONTROL SYSTEM AND DISTRIBUTED CONTROL SYSTEM

BACKGROUND OF THE INVENTION

1. Field of the Invention

The present invention relates to an electric power system protection and control system in combination of digital protection controllers, such as digital relays, to protect and control an electric power system by inputting status quantities of the electric power system and converting them into digital data and a display controller to display and control the monitoring of operation and status of the digital protection controllers via a communication network, and a distributed control system.

2. Description of the Related Art

Digital protection controllers, such as digital relays, are already used widely in the field of the electric power system, and are made highly functional by use of highly efficient microprocessors and memories of large capacity, etc. in recent years. In particular, for the power saving of their operation and maintenance, it becomes possible to realize a remote operation and monitoring system for operating and monitoring the operation and status of digital protection controllers via a wide area transmission network from a long distance.

In these systems, it is possible to display electrical quantities (current and voltage quantities converted into digital data) input from an electric power system at a distant place via a transmission system in addition to the detailed information relative to the operation and status of digital protection controllers. Definite examples of these systems are disclosed in literatures, for instance, (The 1996 National Meeting of The Institute of Electrical Engineers of Japan, Lectured Theses 1529 "Development of Digital Relay Remote Operation Monitoring System").

On a system for the purpose of the remote operation of conventional digital protection controllers, such as digital relays, it takes such a form that along the remote operation menu of digital protection controllers (hereinafter referred to as "Protection Controllers"), a request is submitted from a remote personal computer via a wide area transmission network. When this request is received, the protection controller performs the process according to the request and returns a response to the personal computer that sent the request. An example of the remote operation menu is shown in FIG. 18.

A case is taken to change the setting, for example, the setting of a threshold value of the relay operation in a digital relay, according to a setting menu as an example. As shown in FIG. 19, the steps will be as shown below: First, selecting a display control menu after selecting a substation and equipment and connecting the communication according to a communication menu within a remote operation menu; and then, after further selecting the setting, setting elements to be changed are selected, numerical values to be changed are input and a writing request is submitted to EEPROMs in the protection controller, and thereafter, an operation starting request is submitted.

In this case, until a series of processings is completed, it is necessary to maintain the connection between the personal computer and the protection controllers. Accordingly, there will be a first problem that delay of communication accompanied with increase in the traffic on a communication network and drop of reliability generated from loss of communication packets.

FIG. 19 shows the change of one setting element. But so as to change plural setting elements, a required time further increases. Further, to have a personal computer generate various requests corresponding to the above-described remote operation menu, it is required for the operator to operate the personal computer to each request.

This means that when functions of a protection controller become complicated and versatiled, the number of operations increase and workload of the operator increases. Further, when plural protection controllers are required to execute the same operation, it becomes complicated as the same work is performed for different controllers, and there will be caused such a second problem that with the increase of workload, the drop of reliability due to human error will be generated.

Further, in case of such a remote operation system, plural protection controllers are operated by a single personal computer. In this case, it will become necessary to configure the system by taking differences in the substances of protection controllers (for instance, setting elements due to different protection relaying scheme) into consideration.

The configuration in this case is shown in FIG. 20. As shown in this FIG. 20, the configuration at the personal computer side is corresponding to the kinds of protection controllers. This means that with the increase in kinds of protection controllers, the volume of the corresponding software that is to be provided on a personal computer increases, and there will be such a third problem that the necessity for modification is produced and the economy and reliability of the system will become worse.

Further, in such a remote operation system, as a local network and a wide area transmission network are used, the protection controllers can be easily operated remotely at a place where they can be connected to these communication networks. In other words, the remote operation can be made similarly through personal computers installed at plural locations.

This state is shown in FIG. 21. In this case, it is necessary to provide a remote operation software that is corresponding to each protection controller to each personal computer as described above, and there will be a fourth problem that this system is inferior in the aspect of economy such as required expenses and maintenance.

Further, as it becomes possible to monitor the operation of plural protection controllers by a single personal computer in the remote operation system as described above, it is possible to compare related same items (for instance, electrical quantities of the system taken by plural protection controllers connected to the same system).

In this case, a personal computer is connected to protection controllers subject for communication and displays operating items along the remote operation menu shown in FIG. 18. If it is desired to check the state of the same items on other related controllers, a personal computer is connected similarly to the related controllers for communication and displays the items along the operation menu shown in FIG. 18.

In this case, if the number of protection controllers subject for control is increased, such operations as selection of controllers, connection for communication and selection of items become necessary for each protection controller and the operations becomes very complicated, and related other protection controllers and items are displayed independently for each protection controller. However, as they are not displayed as related protection controllers and items in the same picture, there will be such a fifth problem that the comparison of related items will become an overload for operator.

In this case, it is considered to consolidate the menu for every same related items over plural controllers. But if it is required to see different items for each controller, it will be complicated conversely, and in addition, the maintainability will become a problem when there is an increase/ modification of the controller. Further, there will be such a sixth problem that if the same protection controller is accessed simultaneously by plural display controllers, the processing load of the protection controller increases in order to respond to the access and therefore, a response is delayed.

Further, for such a remote operation system there is the possibility for demand to realize versatile functions. For instance, conventionally the protection, control and measurement of an electric power system are separated as separate controller. It is considered to consolidate these functions in the same controller. In this case, there will be a seventh problem that the processes to be incorporated in a protection controller increase and an excessive load is generated in the aspect of the economical efficiency, reliability and maintainability.

Further, when changing the specification of a protection controller, it is a general practice to stop the controller and change a ROM containing a program, and there will be an eighth problem that the drop of availability of the system and complicated changed workload.

SUMMARY OF THE INVENTION

Accordingly, one object of this invention is to provide an electric power system protection and control system composed of a plurality of protection controllers and a display controller connected via a communication network which is excellent in the operability, economical efficiency, maintainability and reliability without increasing the traffic of the communication network, by utilizing the fact that the protection controllers are connected to the communication network and paying attention to the movement of a program module and the cooperation functions among protection controllers in the system.

Another object of this invention is to provide a distributed control system composed of a plurality of distributed controllers and a display controller connected via a communication network which is excellent in the operability, economical efficiency, maintainability and reliability without increasing the traffic of the communication network, by utilizing the fact that the distributed controllers are connected to the communication network and paying attention to the movement of a program module and the cooperation functions among distributed controllers in the system.

These and other objects of this invention can be achieved by providing a monitor and control system, including a plurality of processing units, each for monitoring or controlling an equipment by inputting a status quantity of the equipment, and a display controller connected to each of the processing units via a communication network, for displaying and controlling an operation and status of each of the processing units for monitoring. Each of the processing units includes a core area not directly connected to the communication network for executing a predetermined processing to monitor or control the equipment, and a web area for sending and receiving a program module to and from the display controller and another one of the processing units or sending an information in the core area to the program module via the communication network, respectively.

According to one aspect of this invention, there is provided an electric power system protection and control system including a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. Each of the protection controllers includes a core area not directly connected to the communication network for executing the protection and control of the electric power system, and a web area for sending and receiving a program module to and from the display controller and another one of the protection controllers or sending an information in the core area to the program module via the communication network, respectively.

According to another aspect of this invention there is provided a distributed control system including a plurality of distributed controllers, each for controlling an equipment to be controlled by inputting a status quantity of the equipment and for converting the status quantity into digital data, and a display controller connected to each of the distributed controllers via a communication network, for displaying and controlling an operation and status of each of the distributed controllers for monitoring. Each of the distributed controllers includes a core area not directly connected to the communication network for controlling the equipment, and a web area for sending and receiving a program module to and from the display controller and another one of the distributed controllers or sending an information in the core area to the program module via the communication network, respectively.

According to another aspect of this invention, there is provided a program storing medium readable by a computer, tangibly embodying a program of instructions executable by the computer to perform method steps for a monitor and control system, including a plurality of processing units, each for monitoring or controlling an equipment by inputting a status quantity of the equipment, and a display controller connected to each of the processing units via a communication network, for displaying and controlling an operation and status of each of the processing units for monitoring. Each of the processing units includes a core area not directly connected to the communication network and a web area. The method includes the steps of executing step for executing a predetermined processing to monitor or control the equipment, at the core area, and step for sending and receiving a program module to and from the display controller and another one of the processing units or sending an information in the core area to the program module via the communication network, respectively, at the web area.

According to another aspect of this invention, there is provided a program storing medium readable by a computer, tangibly embodying a program of instructions executable by the computer to perform method steps for an electric power system protection and control system, including a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. Each of the protection controllers includes a core area not directly connected to the communication network and a web area. The method includes the steps of executing step for executing the protection and control of the electric power system, at the core area and step for sending and receiving a program module to and from the display controller and another one of the protection controllers or sending an information in the core area to the program module via the communication network, respectively, at the web area.

According to another aspect of this invention, there is provided a program storing medium readable by a computer, tangibly embodying a program of instructions executable by the computer to perform method steps for a distributed control system including, a plurality of distributed controllers, each for controlling an equipment to be controlled by inputting a status quantity of the equipment and for converting the status quantity into digital data, and a display controller connected to each of the distributed controllers via a communication network, for displaying and controlling an operation and status of each of the distributed controllers for monitoring. Each of the distributed controllers includes a core area not directly connected to the communication network and a web area. The method includes the steps of step for controlling the equipment, at the core area, and step for sending and receiving a program module to and from the display controller and another one of the distributed controllers or sending an information in the core area to the program module via the communication network, respectively, at the web area.

According to another aspect of this invention, there is provided a monitor and control device, including a plurality of processing units, each for monitoring or controlling an equipment by inputting a status quantity of the equipment, and a display controller connected to each of the processing units via a communication network, for displaying and controlling an operation and status of each of the processing units for monitoring. Each of the processing units includes a core area not directly connected to the communication network for executing a predetermined processing to monitor or control the equipment, and a web area for sending and receiving a program module to and from the display controller and another one of the processing units or sending an information in the core area to the program module via the communication network, respectively.

According to another aspect of this invention, there is provided an electric power system protection and control device, including a plurality of protection controllers, each for executing protection and control of an electric power system by inputting a status quantity of the electric power system and for converting the status quantity into digital data, and a display controller connected to each of the protection controllers via a communication network, for displaying and controlling an operation and status of each of the protection controllers for monitoring. Each of the protection controllers includes a core area not directly connected to the communication network for executing the protection and control of the electric power system, and a web area for sending and receiving a program module to and from the display controller and another one of the protection controllers or sending an information in the core area to the program module via the communication network, respectively.

According to another aspect of this invention, there is provided a distributed control device, including a plurality of distributed controllers, each for controlling an equipment to be controlled by inputting a status quantity of the equipment and for converting the status quantity into digital data, and a display controller connected to each of the distributed controllers via a communication network, for displaying and controlling an operation and status of each of the distributed controllers for monitoring. Each of the distributed controllers includes a core area not directly connected to the communication network for control of the equipment, and a web area for sending and receiving a program module to and from the display controller and another one of the distributed controllers or sending an information in the core area to the program module via the communication network, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
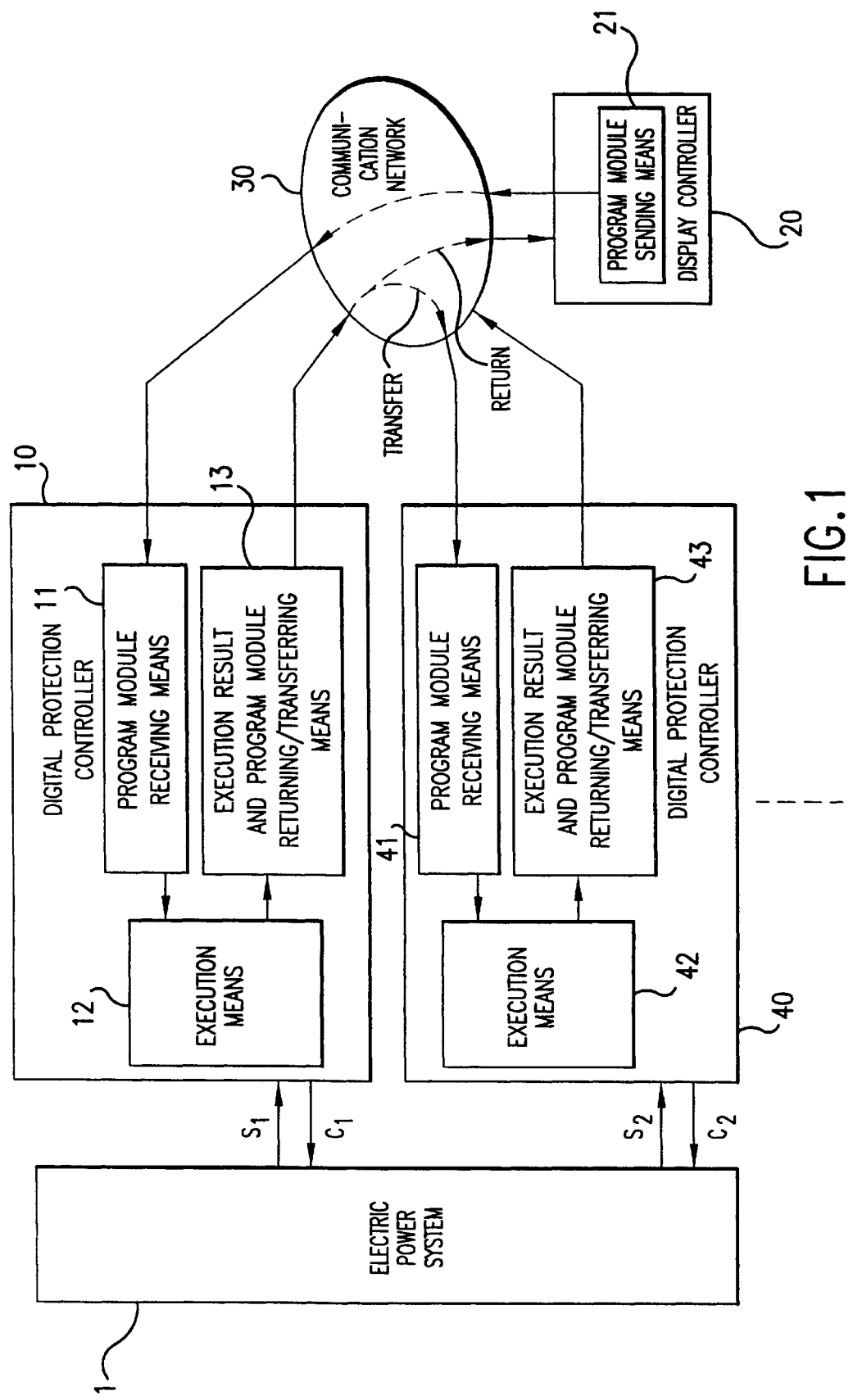
FIG. 1 is a diagram showing the construction of an electric power system protection and control system according to a first embodiment of this invention.

Referring now to the drawings, wherein like reference numerals designate identical or corresponding parts throughout the several views, the embodiments of this invention will be described below.

FIG. 1 is a diagram showing the construction of an electric power system protection and control system according to a first embodiment of this invention. In FIG. 1, 10 is a digital protection controller to perform the protection and control of an electric power system 1 by inputting a status quantity S1 from electric power system 1 that is a subject to the protection and control and outputting a protection and control output C1 to electric power system 1, and it is composed of a program module receiving means 11, an execution means 12 and an execution result and program module returning/transferring means 13.

Further, a display controller 20 remotely controls plural protection controllers including digital protection controller 10 and an another digital protection controller 40 in the same construction via a communication network 30, and it has a program module sending means 21.

Figure 2:
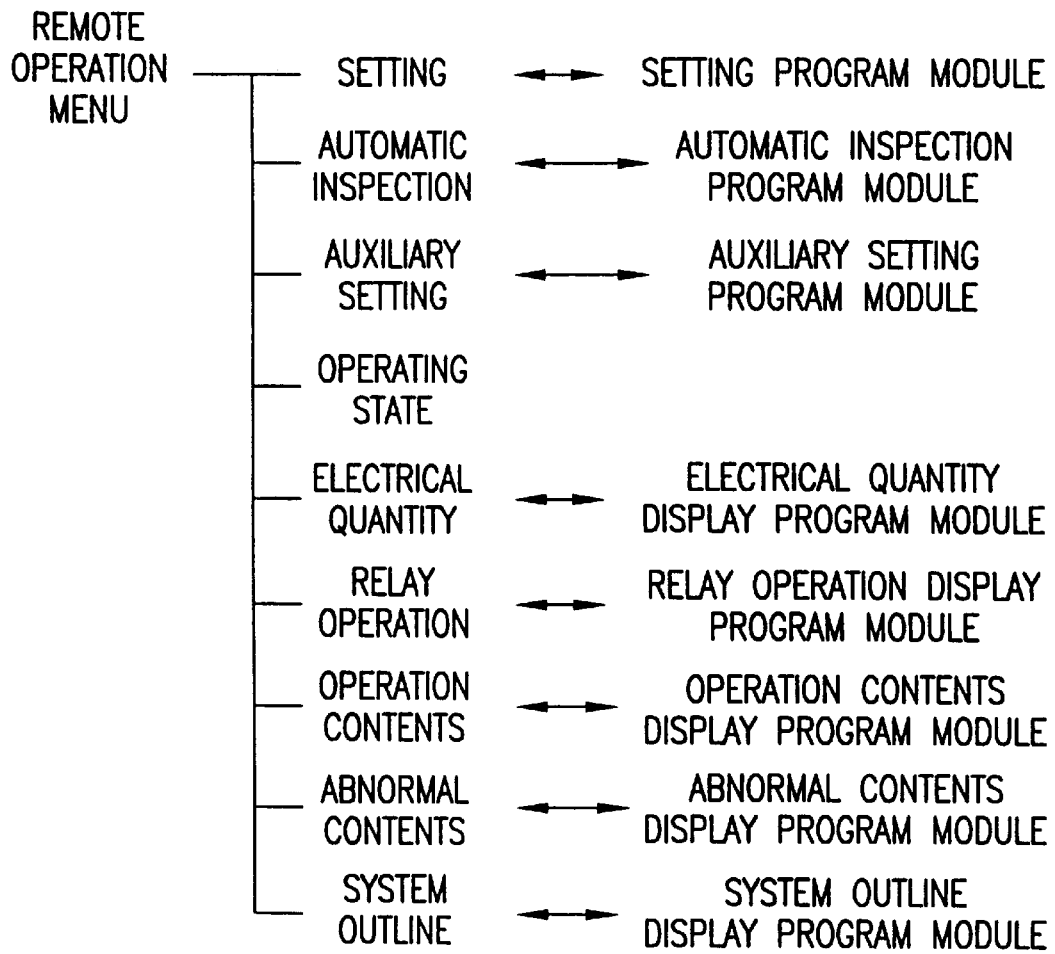
FIG. 2 is a diagram showing the correspondence between screen display menu and program modules in the first embodiment.
Figure 18:
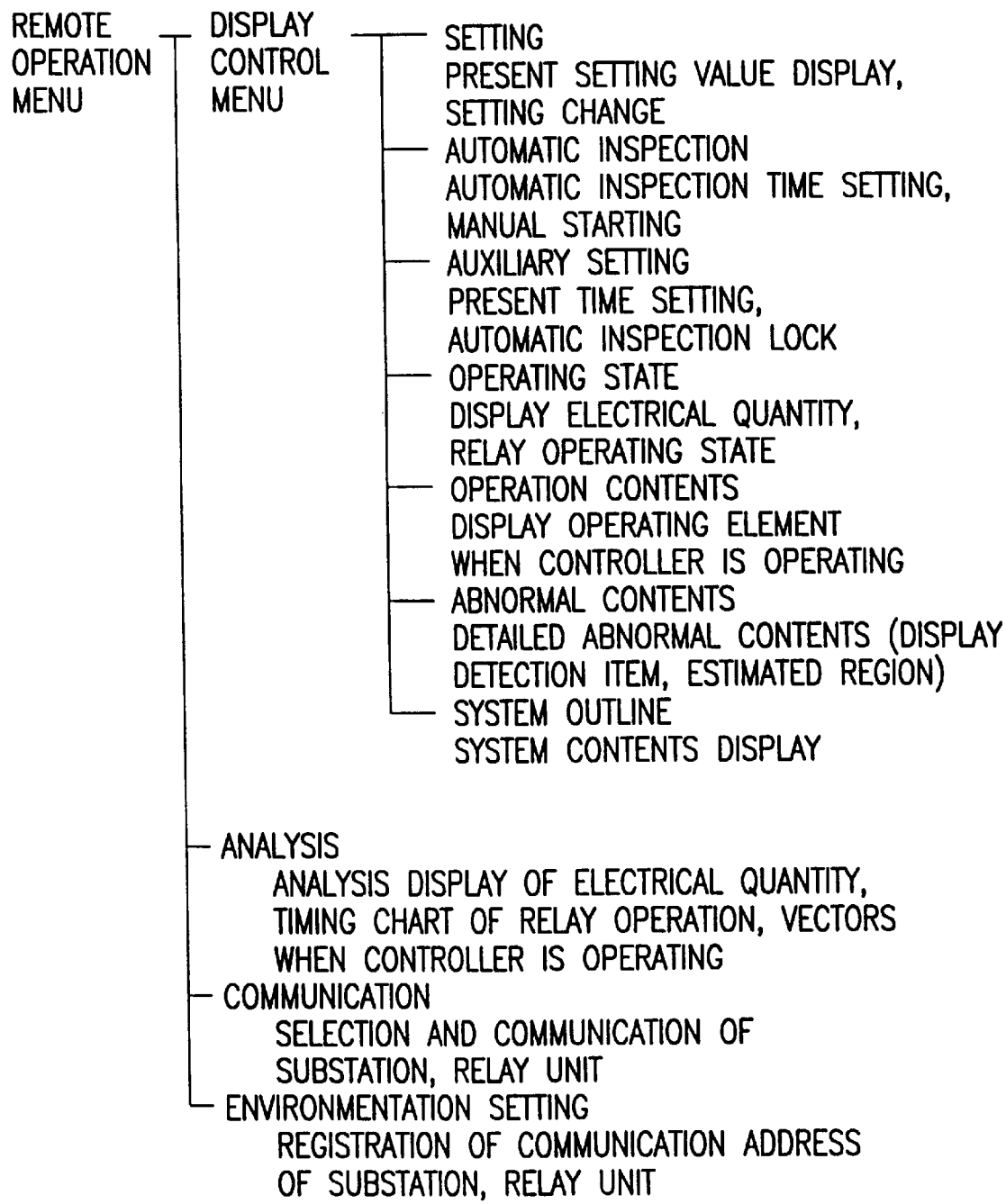
FIG. 18 is a diagram showing one example of a remote control system menu.

As the operations of this embodiment, a program module corresponding to the contents of the display on display controller 20 is first sent out by program module sending means 21 in display controller 20 via communication network 30. For instance, program modules corresponding to items of the remote operation menu shown in FIG. 18 are sent out as shown in FIG. 2.

Here, a program module is composed of a combination of data and the description of steps to process them. For instance, in case of the setting menu described above, data are setting values corresponding to protection controllers and procedural steps can be said to be those procedural steps until these setting values are stored in a specified memory in protection controller.

Figure 3:
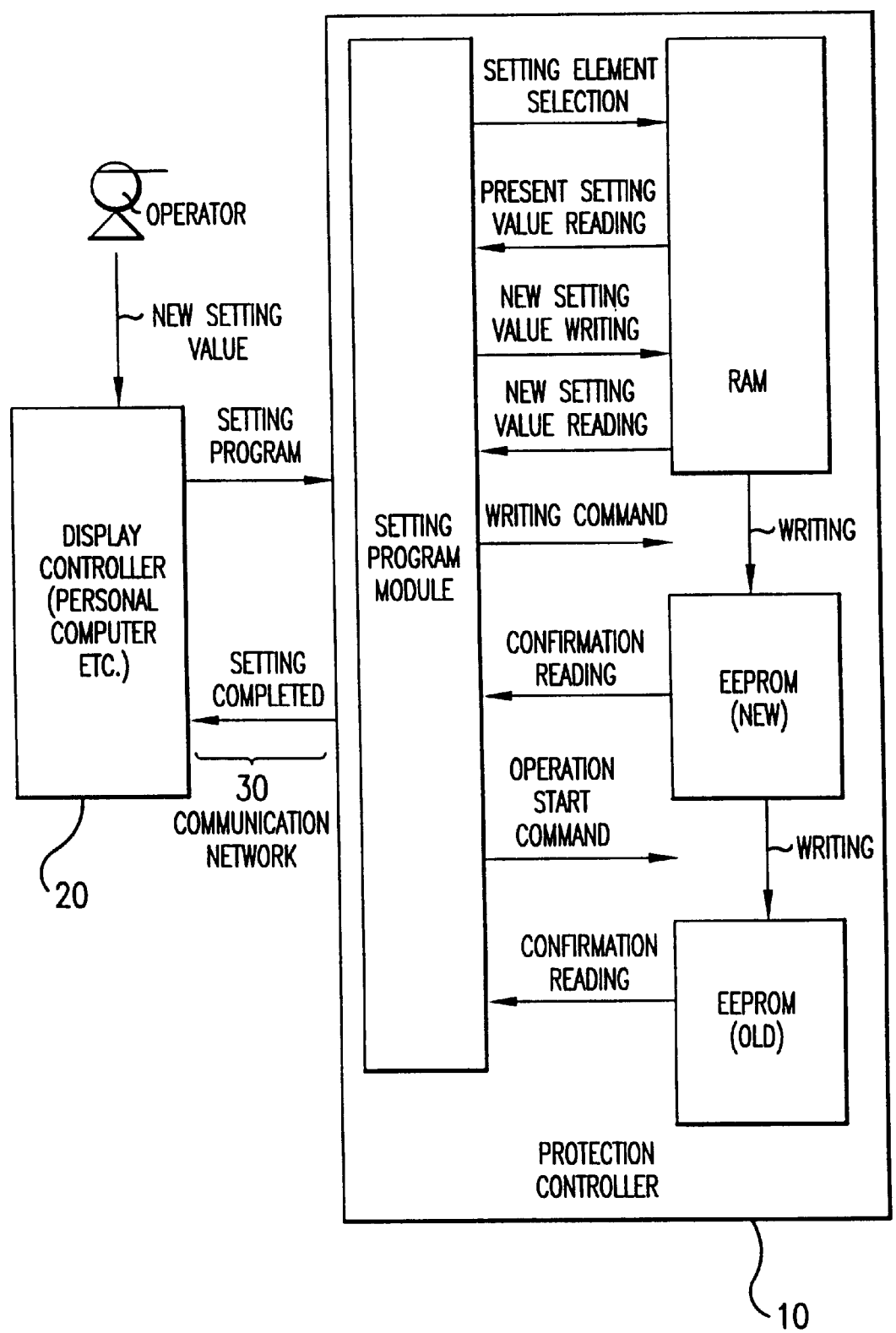
FIG. 3 is a diagram for explaining an action of the first embodiment.

The program module sent out is received by program module receiving means 11 in digital protection controller 10 via communication network 30 and executed by execution means 12. The flow of the sending, receiving and execution processes of the program module in this case are summarized as shown in FIG. 3.

The setting program module sent from the display controller is composed of set value data to be set and procedural steps (for instance, in which memory the setting values are to be stored, to which process resident in the protection controller is to be requested). As a result, the detailed process relative to the setting process is executed in the protection controller. That is, the processes are executed for such hardware resources as RAM, EEPROM (new), EEPROM (former) in the protection controller.

Figure 19:
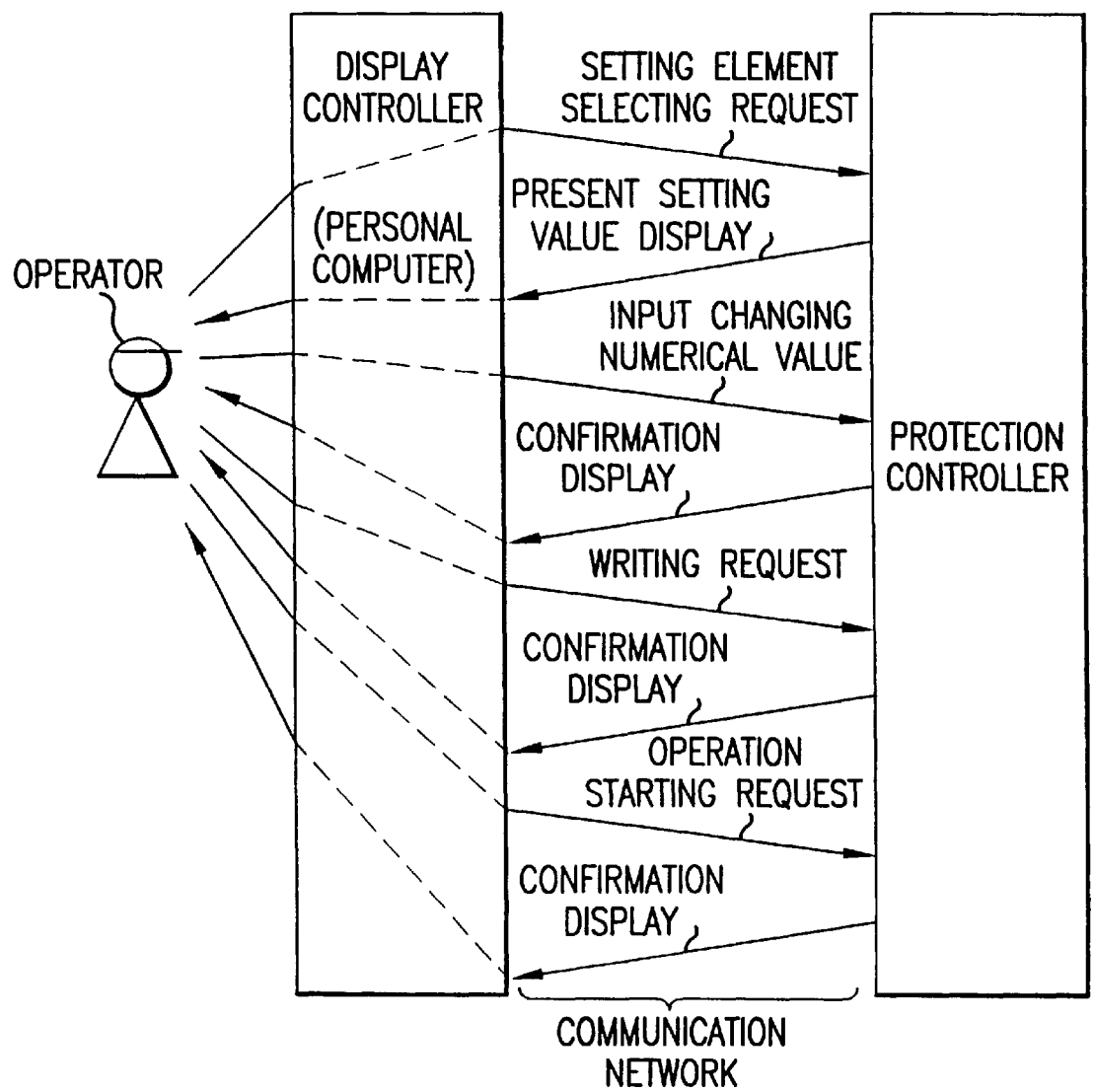
FIG. 19 is a diagram for explaining an action of a conventional electric power system protection and control system.
Figure 20:
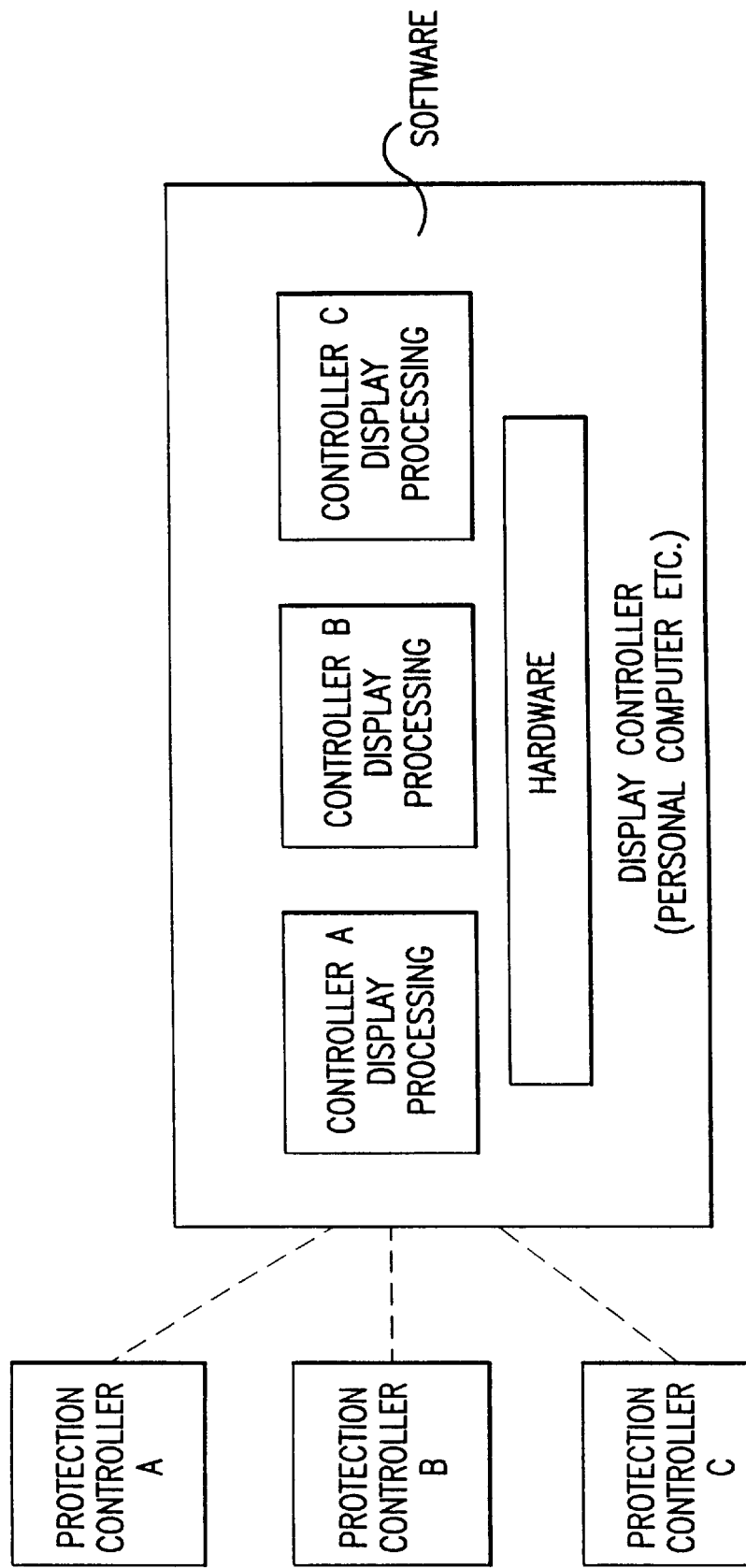
FIG. 20 is a diagram showing the construction of an example of a conventional electric power system protection and control system.
Figure 21:
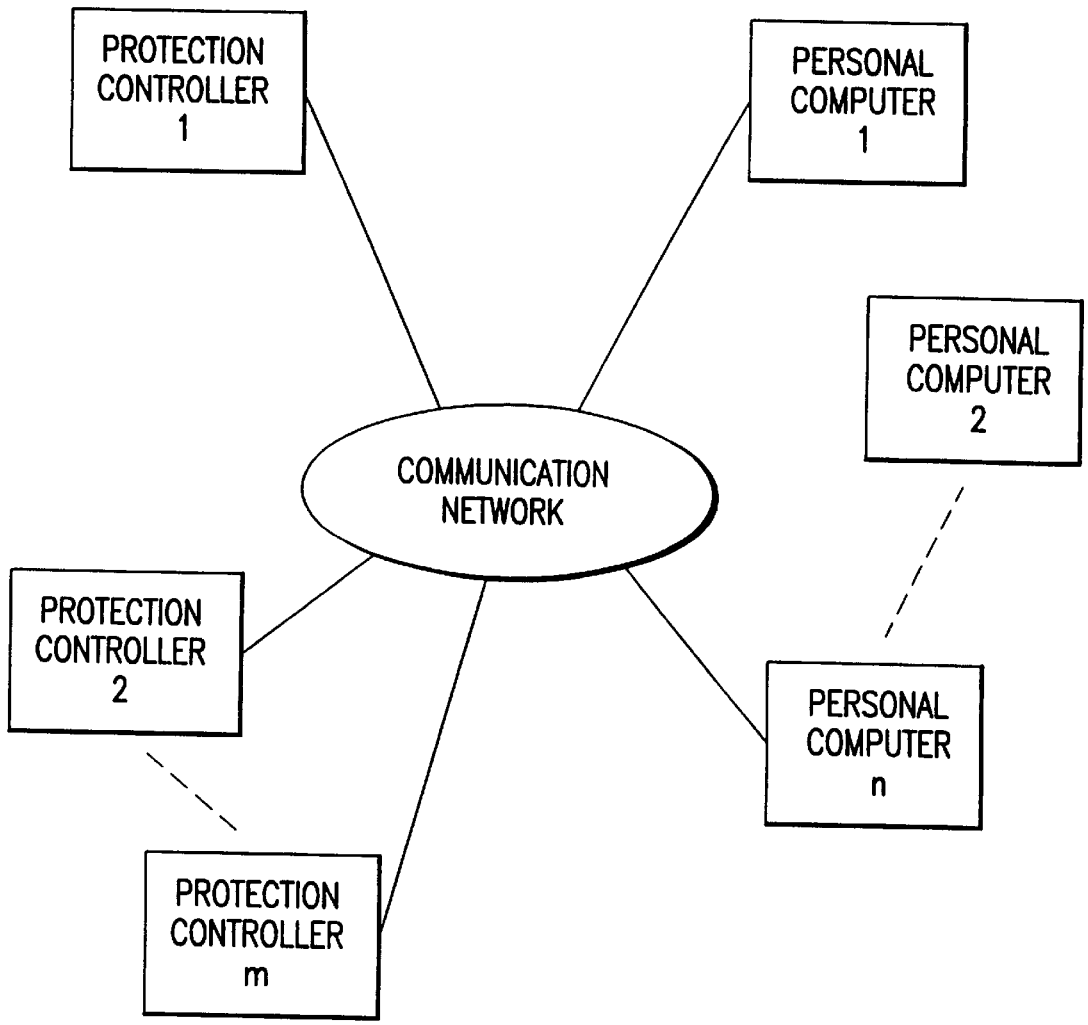
FIG. 21 is a diagram showing the construction of another example of a conventional electric power system protection and control system.

These processes are carried out so far between the display controller and the protection controllers as shown in FIG. 19. In this embodiment, as the setting program module incorporating these processes is moved to the protection controller side and executed therein, the traffic on the communication network is reduced when compared with the prior art. Further the operator is required only to give new setting values to the display controller. Accordingly, such the operation as before to send requests to the protection controllers will not be required for operator.

After the program module is executed by execution means 12, this execution result or the program module is processed by execution result and program module returning/transferring means (hereinafter referred to as returning/transferring means) 13. For instance, in case of the setting program module described above, whether the set result is satisfactory or the set value is not within the specified range and not proper is returned to display controller 20 via communication network 30.

Further, it is also considered that the setting job is carried out in the same contents for plural protection controllers. In this case, the setting program module is transferred to other protection controller 40 using returning/transferring means 13. In protection controller 40, same means 41, 42 and 43 as protection controller 10 are provided and the setting program module is received by a program module receiving means 41, executed by an execution means 42 in the same manner as described above, and the execution result is returned to display controller 20 or the setting program module is transferred to other protection controller by returning/transferring means 43, and processed similarly.

Figure 4:
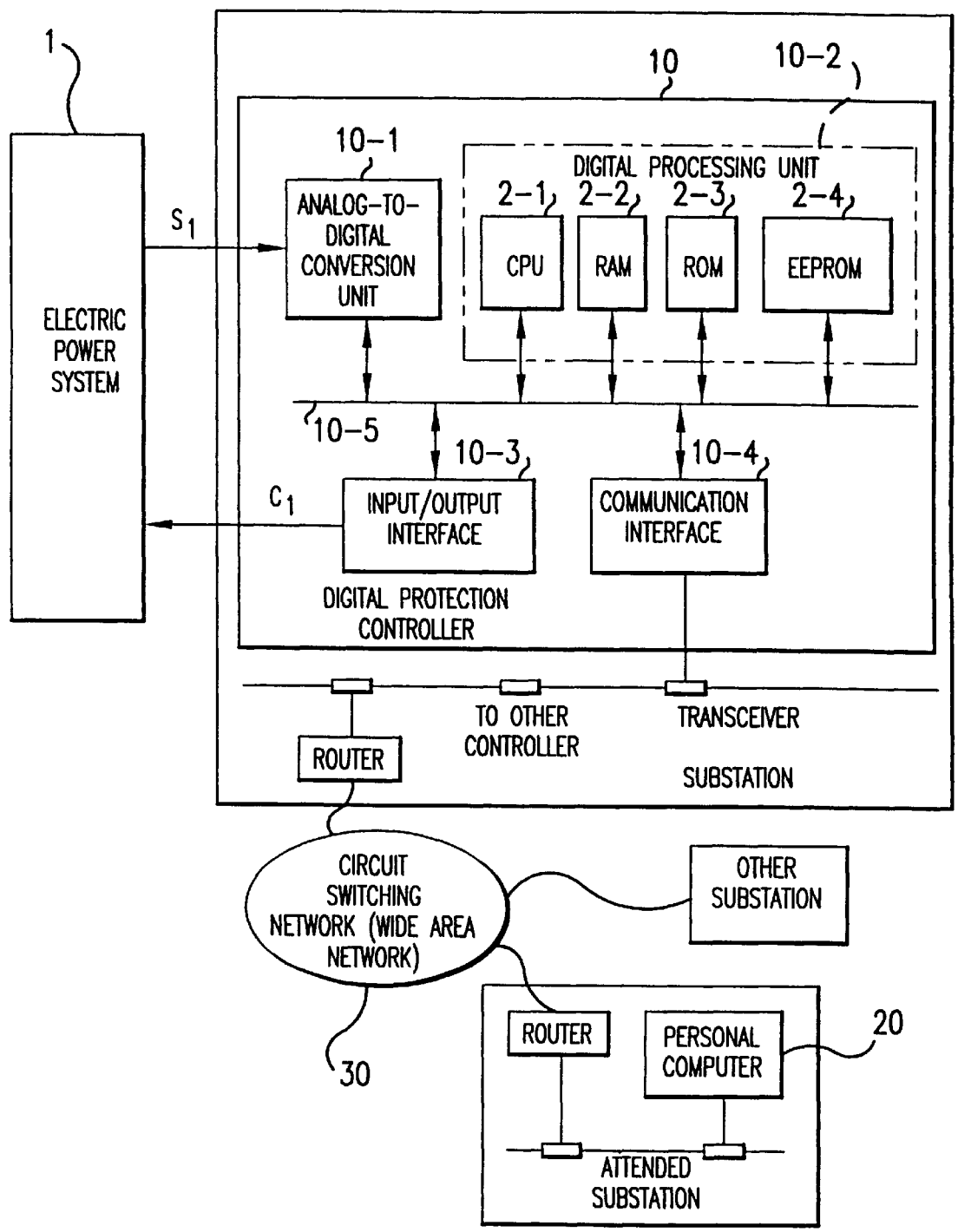
FIG. 4 is a diagram showing an example of the definite construction of the first embodiment.

A definite example of the present embodiment is shown in FIG. 4. Digital protection controller 10 is composed of an analog/digital conversion unit 10-1, a digital processing unit 10-2, an input/output interface 10-3 with external equipment such as a circuit breaker, etc., a communication interface 10-4 to interface communication network 30 and this protection controller 10 and a bus 10-5. Further, all the units 10-1 through 10-4 are mutually connected through bus 10-5.

Analog/digital conversion unit 10-1 is composed of an analog filter, a sampling hold circuit, a multiplexer, an analog-to-digital converter, etc. and taking the status quantities (for instance, current, voltage) of an electric power system that is subject to the protection and control as an analog information and after holding at a specified sampling interval, they are converted into digital quantities.

On the other hand, digital processing unit 10-2 is composed of a CPU 2-1, RAM 2-2, ROM 2-3 and non-volatile memory EEPROM 2-4. The digital converted quantities of electrical quantity data are transferred to RAM 2-2 sequentially. By these data, set values of protective relays stored in EEPROM 2-4 and programs from RAM 2-2 and ROM 2-3, CPU 2-1 performs various protection and control operations.

Here, the present invention differs from a conventional protection controller in that a part of program is sent to RAM 2-2 through communication network 30 and processed as a program in digital processing unit 10-2. The present invention features that the program modules is sent to RAM 2-2 via communication network 30 and transferred to a RAM of another protection controller while in the conventional protection controller, programs are fixedly written in ROM 2-3. This digital processor 10-2 composes execution means 12, and a part of receiving means 11 and returning/transferring means 13.

Next, input/output interface 10-3 is an interface to take the state of external control equipment such as information on a breaker and to output protection relay operation, return output, trip command, etc. to external equipment. Further, communication interface 10-4 is one of the features of this invention and connects an ethernet LAN with protection controller 10, as shown in FIG. 4. Part of program module receiving means 11 and returning/transferring means 13 is realized by this communication interface 10-4.

That is, the program module from communication network 30 is received here and transferred to RAM 2-2. The program module executed in digital processing unit 10-2 is sent to communication network 30 via this communication interface 10-4 and transferred to display controller 20 or another protection controller. A definite example of the construction of the electric power system protection and control system is as described above.

Further, as an example of a communication network 30, it is composed of a network connecting protection controllers in a local range such as substation by an ethernet LAN, a network connecting personal computers and work stations in attended substation and a wide area network connecting both the networks in a wide area, as shown in FIG. 4.

The construction of an ethernet LAN is general and the explanation will be omitted here. Further, as a wide area network, circuit switching networks such as telephone circuits are used. Display controller 20 described above is achieved by a personal computer shown in FIG. 4. Program module sending means 21 is achieved by a software in the personal computer and an interface circuit of an ethernet LAN.

Figure 5:
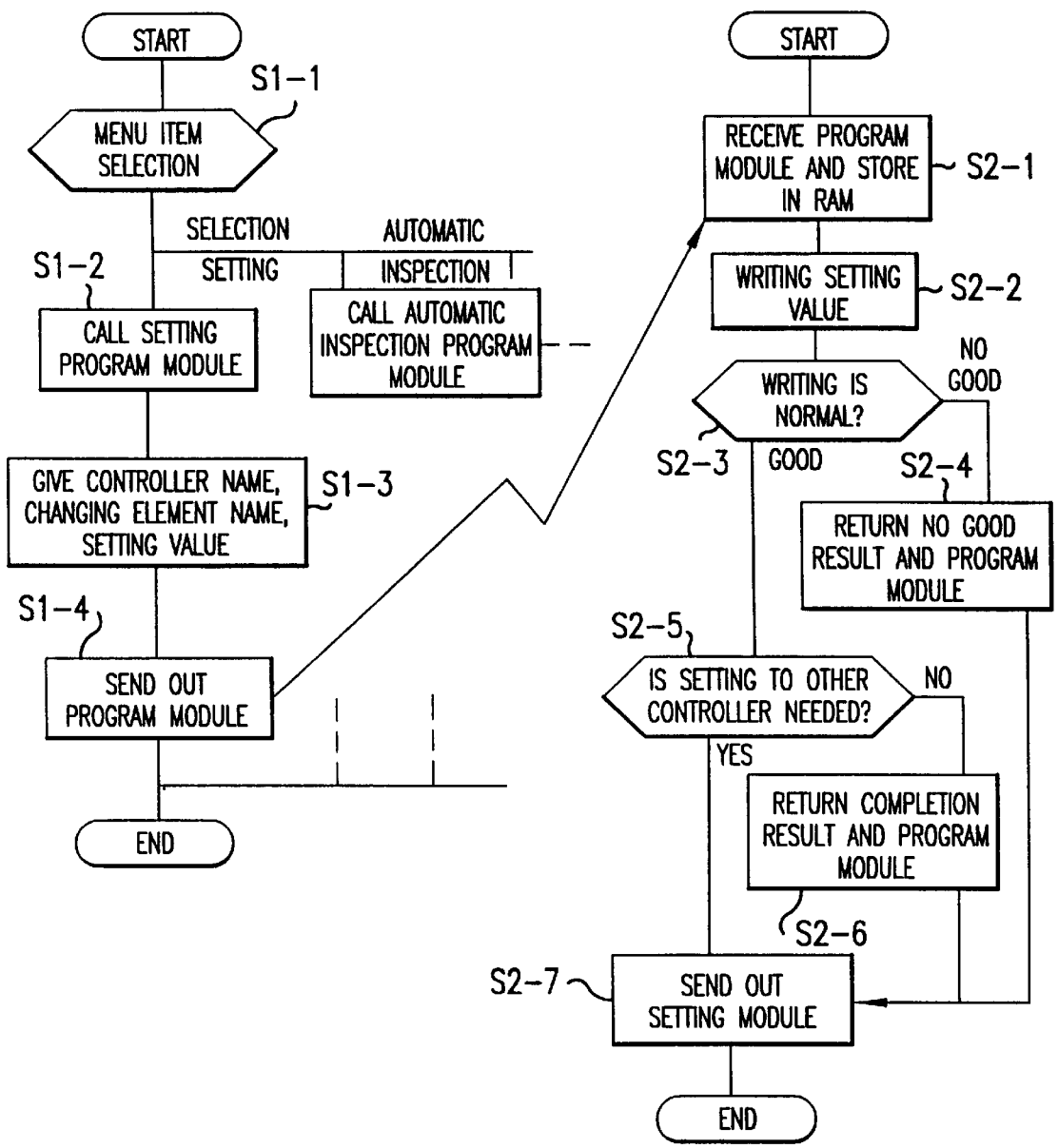
FIG. 5 is a flowchart showing the processing contents of the first embodiment.

Next, the details of actions of the present embodiment will be described using the flowchart shown in FIG. 5. First, the flowchart of the personal computer (display controller 20) side will be described. The remote operation menu described above is displayed on the display of the personal computer, and an operator selects an item in the remote operation menu in Step S1-1. For instance, when the setting job is selected, a setting program module is read out in Step S1-2.

In Step S1-3, operator gives such data as a name of equipment of which setting is to be changed, a name of setting element to be changed, a set value, etc. to this setting program module. In Step S1-4, these data are stored in the setting program module and the setting program module is sent out to communication network 30. The details of program sending means 21 are as described above.

Then, protection controller 10 receives the setting program module in Step S2-1 and stores in RAM 2-2. This operation is equivalent to program module receiving means 11. In Step S2-2, this setting program module writes setting values in RAM, EEPROM (new) and EEPROM (former) in order while checking them as described above. This operation is equivalent to execution means 12.

So far, data receiving and request between the setting process and EEPROM and RAM are made via communication network 30 each time, but are all completed in protection controller 10 in this invention. Then, the execution result is judged in Step S2-3. If it is defective (for instance, the writing into EEPROM and RAM is incomplete and specified values are not written), the setting is again needed and the defective result and the program module are returned to display controller 20 in Step S2-4.

When the execution result is satisfactory and the setting to other controller is not needed in Step S2-5, the completion result and the program module are similarly returned to display controller 20 in Step S2-6. Further, if the setting to other controller is needed, a name of other controller described in the setting program module is read in Step S2-7 and the setting program module is sent out with that equipment as a destination. The operations from Steps S2-3 through S2-7 are equivalent to returning/transferring means 13.

According to the above embodiment, as a program module itself corresponding to jobs that are performed by operator are sent to the protection controller from the display controller via the communication network for execution in the protection controller, it becomes possible to reduce the traffic on the communication network and improve the reliability. Further, as such works as operations corresponding to various requests and the same work required for plural controllers are no longer required as before, it becomes possible to reduce workload of the operator and pro vide a highly economical and reliable electric power system protection and control system.

Figure 6:
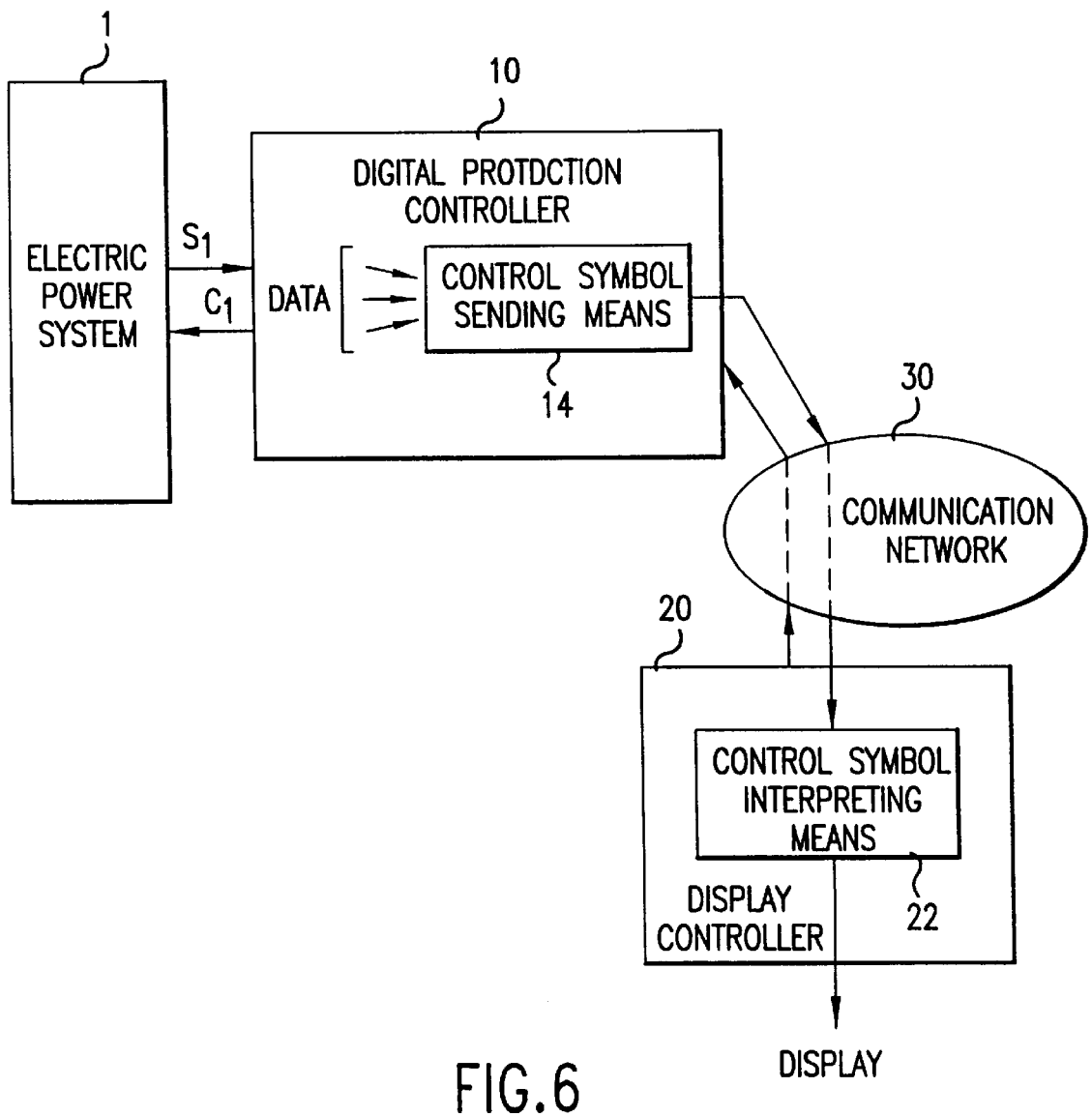
FIG. 6 is a diagram showing the construction of an electric power system protection and control system according to a second embodiment of this invention.

FIG. 6 is a block diagram showing the construction of an electric power system protection and control system according to a second embodiment of this invention. In FIG. 6, 10 is digital protection controller to perform the protection and control of electric power system 1 by inputting status quantity S1 from electric power system 1 that is a subject of the protection and control, and is provided with a control symbol sending means 14. Further, display controller 20 remotely controls digital protection controller 10 via communication network 30 and is provided with control symbol interpreting means 22. This embodiment features the mechanism to control the layout structure of the display form when displaying or changing various data in protection controller 10 on the screen of display controller 20.

Figure 7:
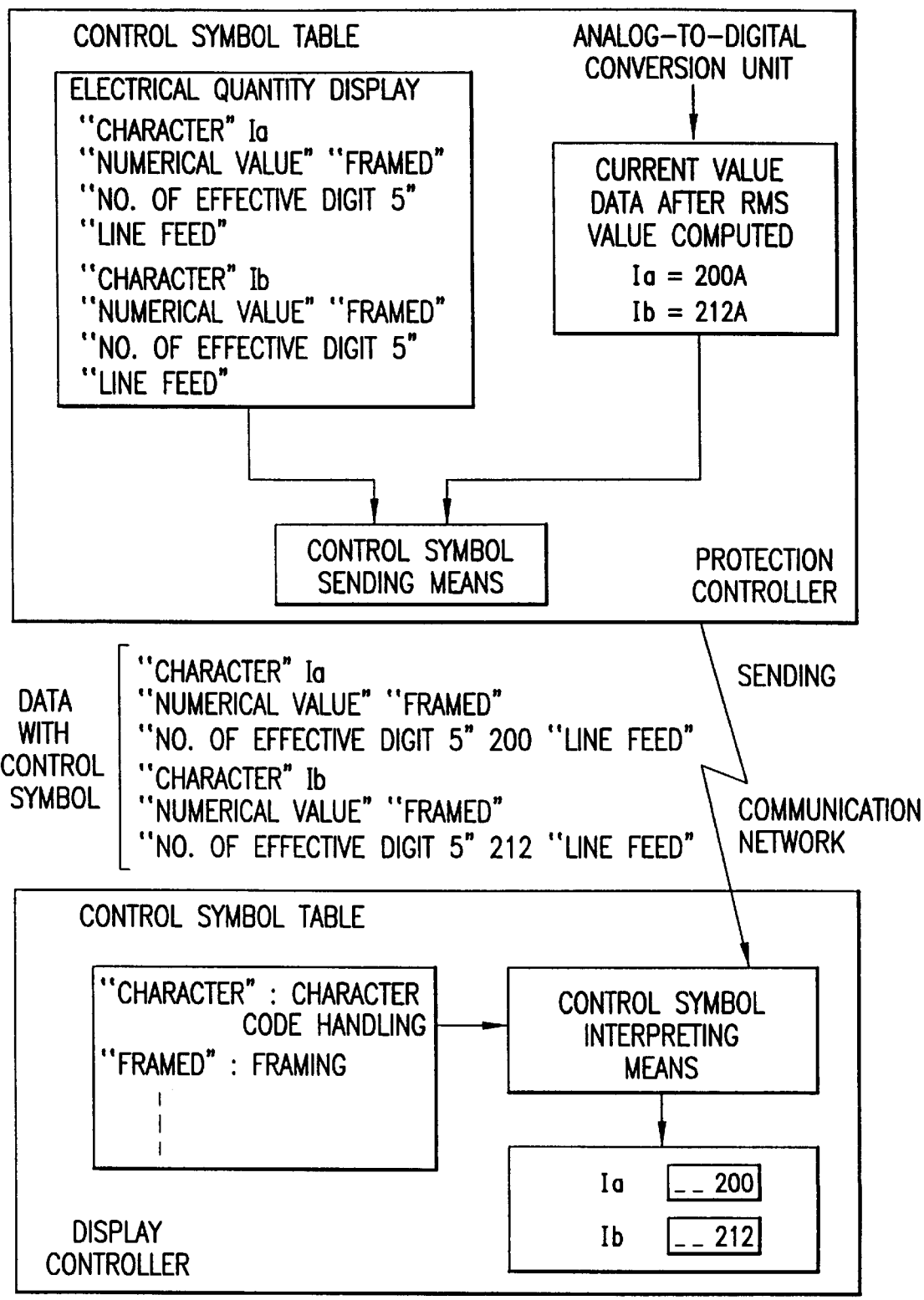
FIG. 7 is a diagram for explaining an action of the second embodiment.

A definite example is shown in FIG. 7. Shown in FIG. 7 is an example when current values obtained from electric power system 1 are displayed and RMS values of two current values Ia, Ib are shown. In this case, current values are measured value data that change with time. As shown in this figure, by combining what is described as a control symbol table and current value data, control symbol sending means sends the data formatted with a control symbol added to each data to display controller 20. Here, as item names, control symbols "Character" corresponding to the character data Ia, Ib are added. Further, RMS values of Ia, Ib as changing numerical information are added with such control symbols as "Numerical Value", "Framed", "Effective Number of Digits 5", "Line Feed".

In display controller 20, control symbol interpreting means 22 interprets how and in what form the received data should be arranged from the received data with control symbols and a control symbol table retained in itself and displays them on the screen. In this example, item names Ia, Ib have the control symbol "Character" as shown in FIG. 7, and they are interpreted and displayed as character codes, respectively. Further, numerical data are treated as numerical information and displayed in a frame and in not more than 5 digits of effective number. Further, the line feed is made according to the line feed control symbol. Thus, data of electrical quantities are displayed.

Figure 8:
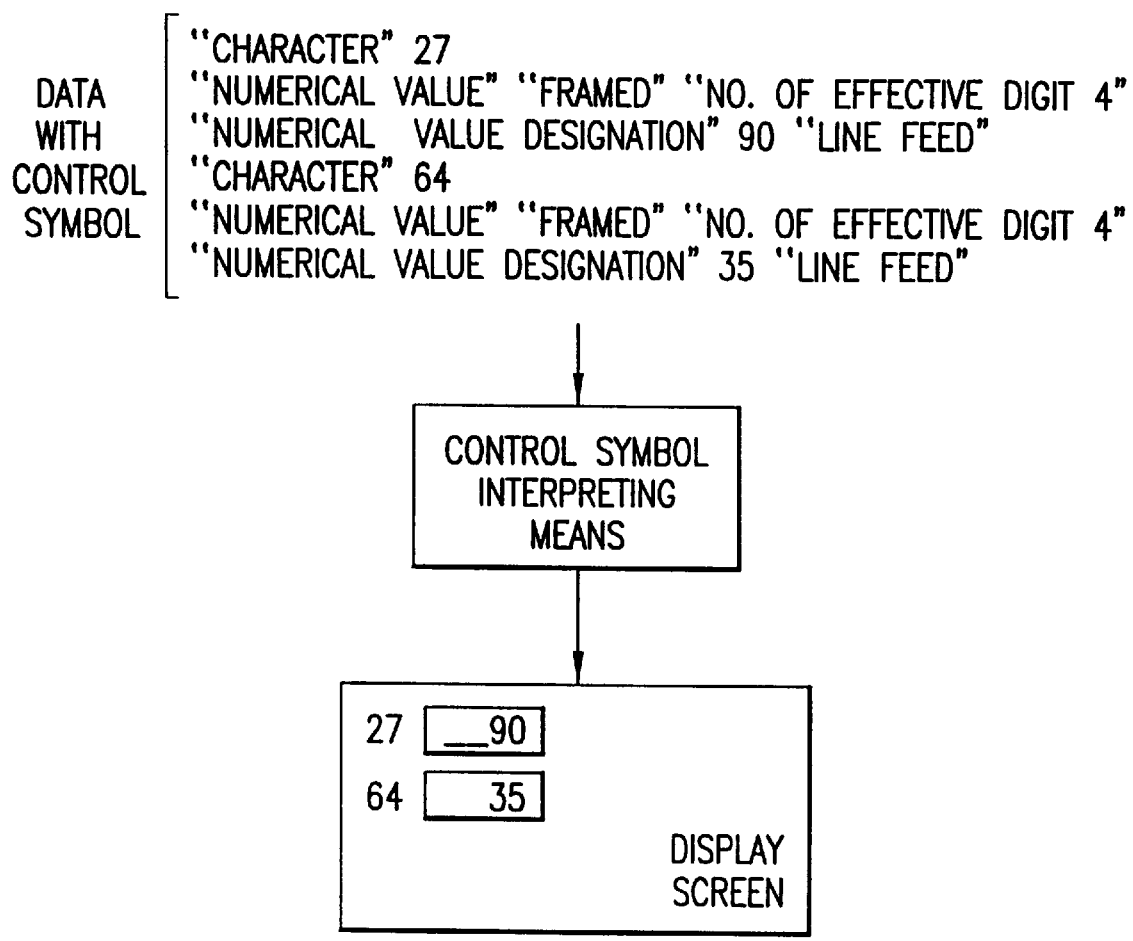
FIG. 8 is a diagram for explaining another action of the second embodiment.

As another example, on the setting value changing screen shown in FIG. 8, two character data of 27, 64 are sent as the setting element names from the protection controller side. The control symbol "Character" is added to these character data similar to the example of electrical quantities as described above. Regarding setting values, such control symbols as "Numerical Value", "Framed", "Effective Number of Digits 4", "Numerical Value Designation", "Line Feed" are added to present setting value data (e.g., 90, 35).

Thus, the display picture of the display controller after the interpretation becomes as shown, and a present setting value is displayed in not more than 4 digits for each setting element. Further, the present setting values can be changed to new setting values by control symbols for designating numerical values. Thus, it becomes possible not only to display present data of the protection controller but also designate data rewriting place by adding control symbol.

The definite construction of this embodiment is the same as that of the first embodiment and becomes the system construction shown in FIG. 4. Here, control symbol sending means 14 described above is realized by the program written in ROM 2-3, and the control symbol table is likewise stored in ROM 2-3. Further, for data of electrical quantities, the instantaneous current value data transferred to RAM 2-2 from analog/digital conversion unit 10-1 in response to the request from display controller 20 are further processed for RMS value by CPU 21 and are used.

The setting value data stored in EEPROM are used as described above. Display controller 20 is realized by a personal computer and so on, and control symbol interpreting means 22 is also realized by a software of a personal computer.

According to this embodiment, when plural protection controllers are remotely controlled by one personal computer via a communication network, it becomes not necessary to construct a display software at the personal computer side by taking various layouts with respect to the difference in contents of plural protection controllers, for instance, number of electrical quantities of the system, number of setting elements, number of digits, frame display, etc. into consideration.

This is because control symbols for layout are added to data to be displayed or changed in the protection controller side, and the display can be made only by providing a software for interpreting the control symbols in the personal computer side. Therefore, there is such a merit that the software size at the personal computer side does not become large and the electric power system protection and control system is excellent in the economical efficiency.

Further, when the contents of the protection controller are changed due to the change in manufacturing specifications, conventionally it is needed to change a software of a personal computer correspondingly. But, according to this embodiment, it is sufficient to modify the protection controller side only and thus, the reliability is improved. Further, even when many personal computers are used, number of software to be provided is only one kind. As a result, there is such a merit that the maintenance resulting from increase in kinds of protection controllers is easy and the system is excellent in economical efficiency. Further, though one example of control symbols is shown in FIG. 7 and FIG. 8, this invention is applicable to all control symbols determining the layout structure of display, and the effect is the same.

Figure 9:
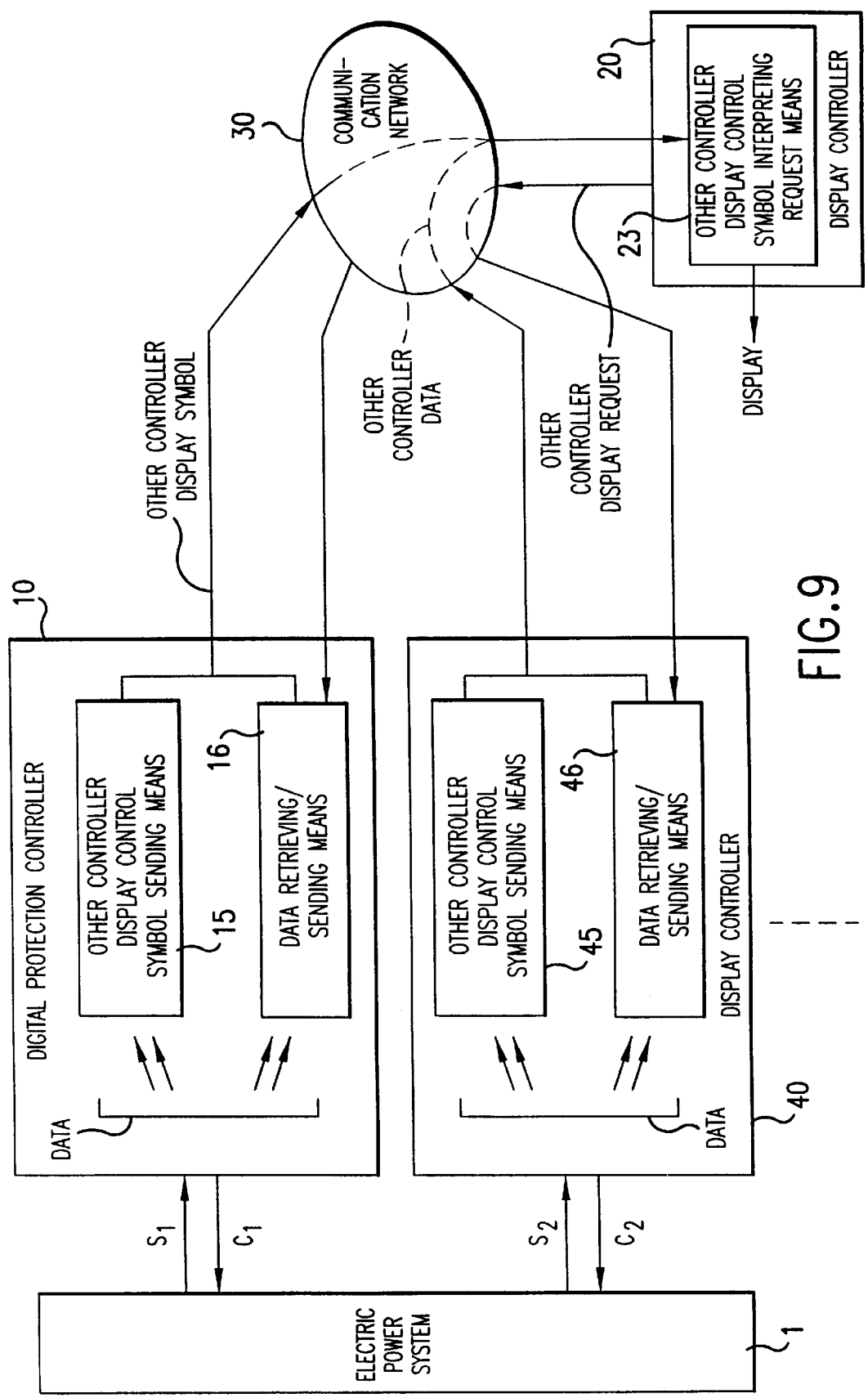
FIG. 9 is a diagram showing the construction of an electric power system protection and control system according to a third embodiment of this invention.

FIG. 9 is a block diagram showing the construction of an electric power system protection and control system according to a third embodiment of this invention. In FIG. 9, 10 is a digital protection controller to perform the protection and control of electric power system 1 by inputting status quantity Sl from electric power system 1 that is an object of protection and control, and is further provided with, in addition to the system shown in FIG. 6, other controller display control symbol sending means 15 and a data retrieval/sending means 16. Further, display controller 20 remotely operates plural controllers such as digital protection controllers 10 and controller 40 in the same construction via communication network 30 and is further provided with, in addition to the system shown in FIG. 6, other controller display control symbol interpreting means 23.

Figure 10:
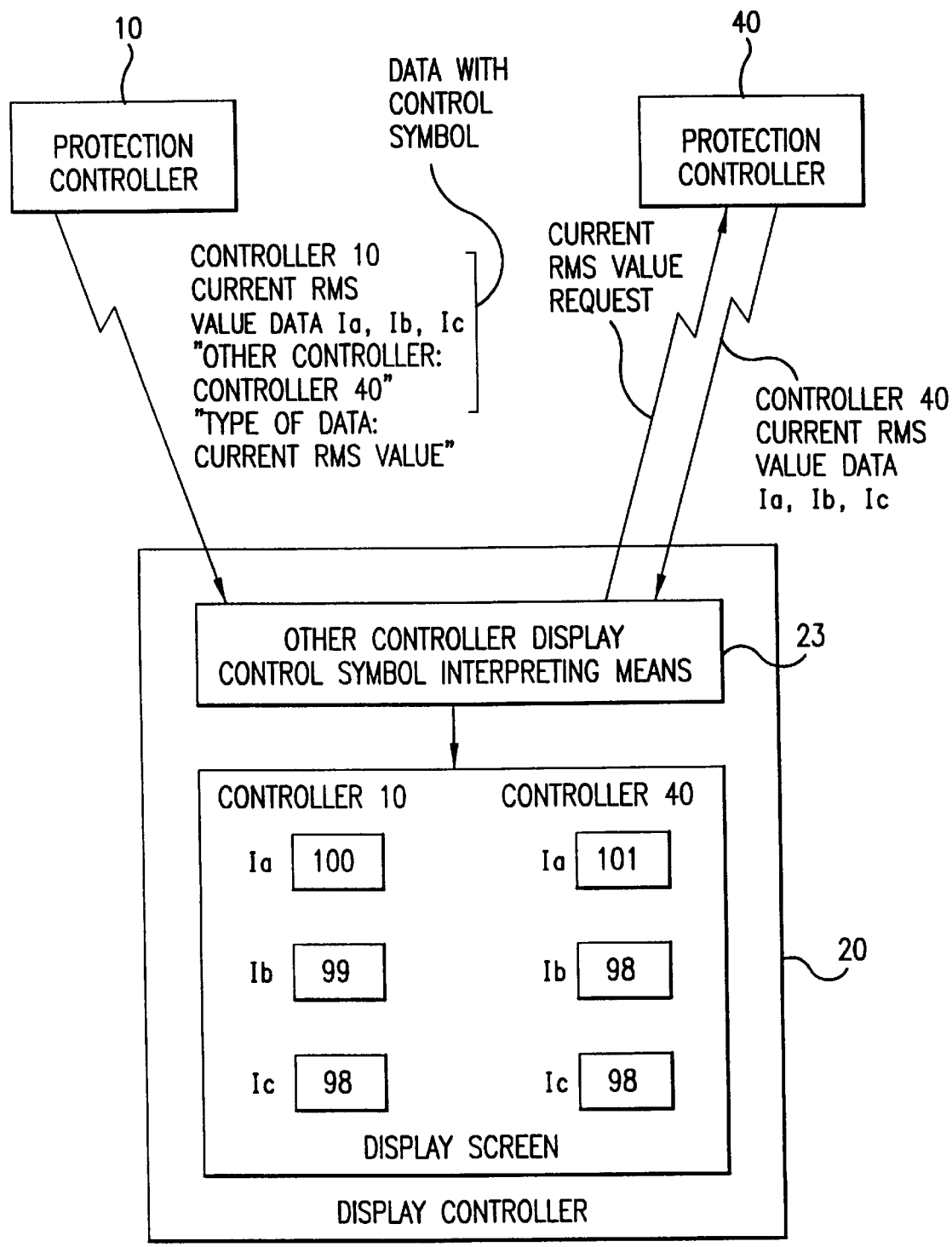
FIG. 10 is a diagram for explaining an action of the third embodiment.

The operation of this display controller 20 will be described using FIG. 10. FIG. 10 shows the operation of display controller 20 in the form that is able to compare the magnitudes of electrical quantities of the system taken by both protection controllers 10 and 40 in the structure described above in terms of sizes of currents when two protection controllers 10, 40 are remotely controlled on one display controller 20.

First, a request for sending electrical quantity data is output to digital protection controller 10 from a personal computer (display controller 20). In response to the request, digital protection controller 10 sends out electrical quantity data (current RMS values) Ia, Ib and Ic in the own controller. Further, jointly with this data, "Other Controller Name: Controller 40", "Data Identification: Current RMS Values" are sent out as control symbols by other controller display control symbol sending means 15 in protection controller 10.

Display controller 20 interprets these control symbols by other controller display control symbol interpreting means 23 and requests current RMS values to protection controller 40. Receiving this request, protection controller 40 retrieves current RMS values Ia, Ib and Ic by data retrieving/sending means 46 and sends them to display controller 20. The display screen will become as shown in this figure.

Figure 11:
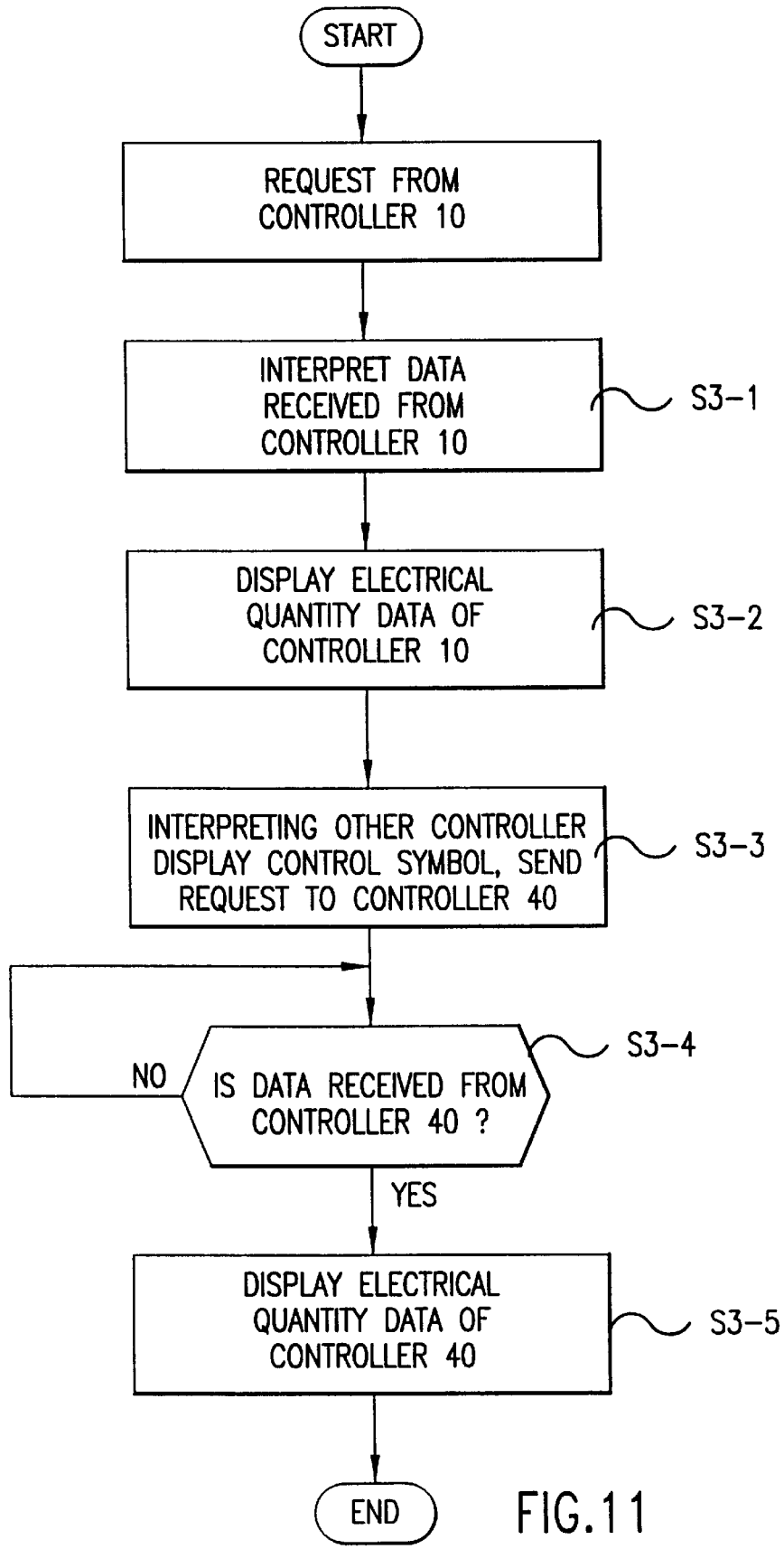
FIG. 11 is a flowchart showing the processing contents of the third embodiment.

The flow of operation of display controller 20 at this time is shown in FIG. 11. In FIG. 11, data sent from digital protection controller 10 are first interpreted in order in Step S3-1 and electrical quantity data relative to digital protection controller 10 are displayed in Step S3-2. In Step S3-3, the other controller display control symbols contained in the received data are interpreted and a request signal is sent out to digital protection controller 40 that is designated from the name of the controller. In Step S3-4, display controller 20 waits until data are sent from protection controller 40 and displays data at the received timing in Step S3-5.

According to this embodiment, when data from two different controllers are viewed from the operator, it becomes possible to display them as if they are data in the same controller. Conventionally, to acquire data from different controllers, the operator has to rework from the connection for communication and the operation is complicated. In this embodiment, as the display controller automatically interprets control symbols and sends a request to other controllers, the operation becomes easy and this electric power system protection and control system is excellent in the reliability and operability.

Further, as this system is in such structure that control symbols are provided at the protection controller side, the same effect as the second embodiment can be expected. Further, as control symbols discriminating the name of other controller and type of data are added to display data of protection controller that is a subject of protection and control, the operator is able to display data of plural controllers and operate them in a combined form. This will become a very efficient means when collecting data, comparing and analyzing data of an electric power system protection and control system installed in a wide range.

The definite construction of this embodiment is the same as that of the first embodiment, that is, it becomes the system construction shown in FIG. 4. Here, other controller display control symbol sending means 15 is realized by a program written in ROM 2-3, and also, the control symbol table is similarly stored in ROM 2-3. Further, the electrical quantity data transferred from analog/digital conversion unit 10-1 to RAM 2-2 in response to the request from display unit 20 is used.

Display controller 20 is realized by a personal computer, etc. and other controller display control symbol interpreting means 23 is also realized by a software of the personal computer. Further, current RMS values are designated as type of data for control symbols in the above embodiment, but even when type of data is not specifically designated, the effect is the same if the name of other controller is designated as a control symbol.

In other words, while checking data of selected controller on the screen, the connection with other controller can be automatically made and thus, an operating work volume can be reduced more than before. Further, in the above flowchart, data of other controller is automatically acquired in Step S3-3, even if they are acquired after so instructed by operator, the same effect is obtained.

Figure 12:
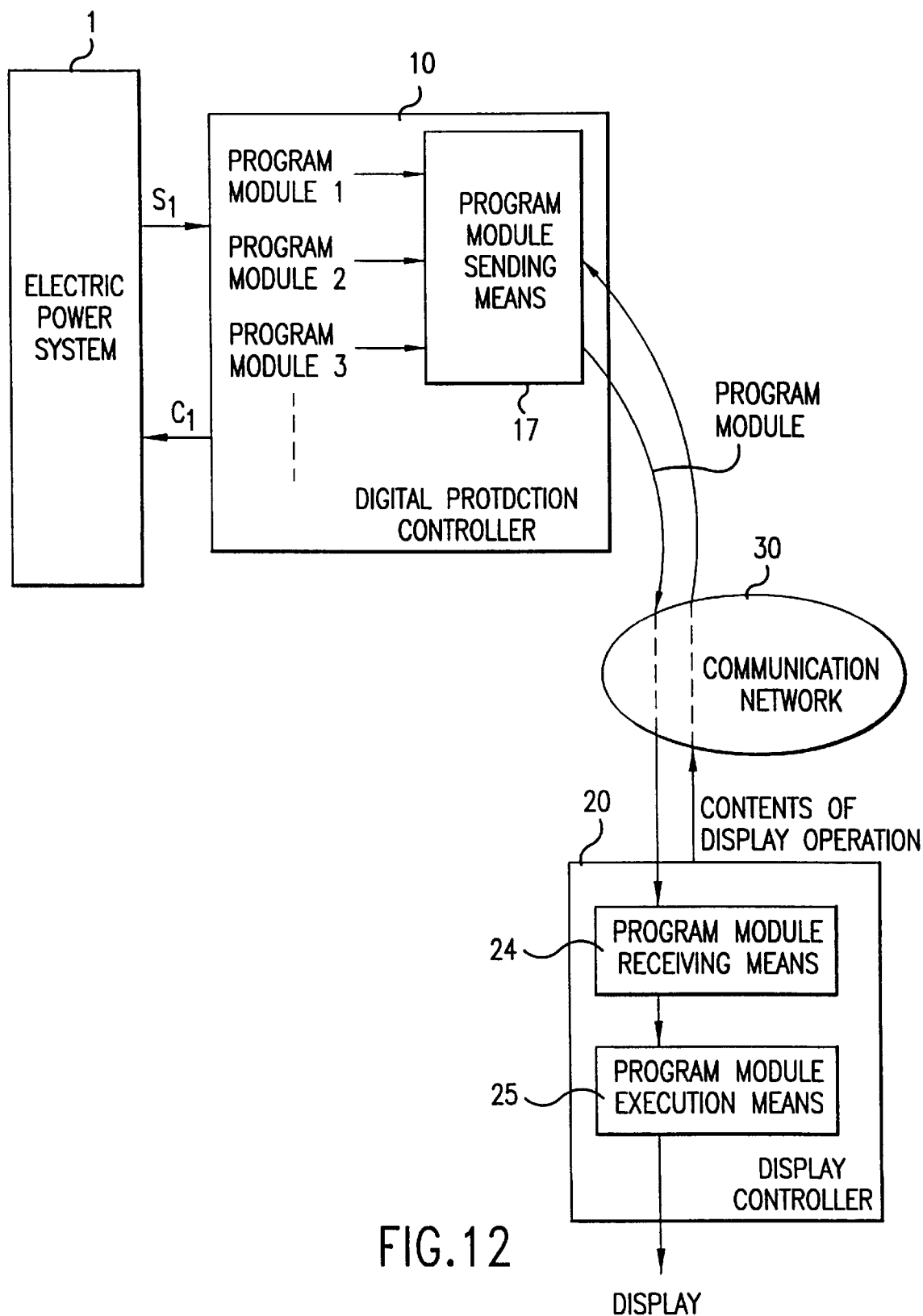
FIG. 12 is a diagram showing the construction of an electric power system protection and control system according to a fourth embodiment of this invention.

FIG. 12 is a block diagram showing the construction of an electric power system protection and control system according to a fourth embodiment of this invention. In FIG. 12, 10 is digital protection controller to perform the protection and control of electric power system 1 by inputting status quantity S1 from electric power system 1 that is an object of the protection and control, and is composed of a program module sending means 17. Further, display controller 20 remotely operates digital protection controller 10 via communication network 30 and is composed of a program module receiving means 24 and a program module execution means 25.

As its operations, contents to be displayed on display controller 20 (menu items, etc.) are first sent to protection controller 10, and the program module corresponding to the item sent to protection controller 10 is selected and is sent to display controller 20 using program module sending means 17. Display controller 20 receives this program module by program module receiving means 24 and program module execution means 25 executes it and displays the execution result.

When displaying plural electrical quantities, for instance, RMS value and phases of three phases of voltage and three phases of current, an electrical quantity displaying program module is selected by program module sending means 17 as a program module corresponding to a selected item of the remote operating menu. As regard selecting which module in connection with which item, the protection controller has a corresponding table.

This electrical quantity display program module computes and displays RMS values and phases of three phases of voltage and three phases of current, and it computes RMS values and phases from instantaneous values of current and voltage obtained from analog/digital conversion unit 10-1 shown in FIG. 4.

Figure 13:
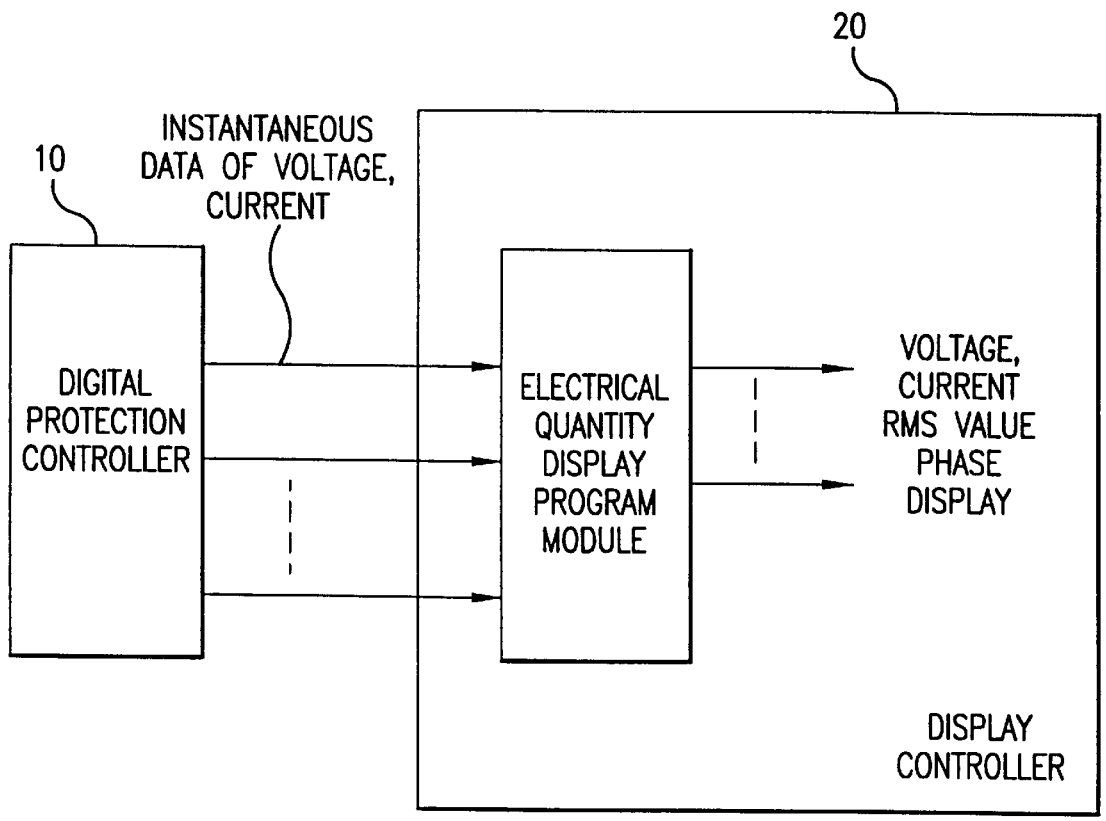
FIG. 13 is a diagram for explaining an action in the fourth embodiment.

This invention features that this program module is moved to display controller 20 and executed at display controller 20 side. Thus, when instantaneous data of current and voltage are sent to the display controller 20, the program module operates RMS values and phases using these data and displays them as shown in FIG. 13.

The definite construction of this embodiment is similar to that of the first embodiment and becomes the system construction shown in FIG. 4. Here, program module sending means 17 is realized by the program written in ROM 2-3 and a program module that becomes an object of selection is also stored in ROM 2-3. Further, display controller 20 is realized by a personal computer, etc., program module receiving means 24 and program module execution means 25 are also realized by a software of a personal computer.

Further, the operating method of RMS values and phases of electrical quantity may differs depending on the contents of the protection controller. For instance, in analog/digital conversion unit 10-1, its hardware has different sampling intervals: that is, electrical angles 30°, 15°, 7.5° and 3.75° are present. Therefore, the operation to obtain RMS values and phases using instantaneous value data sampled at these sampling intervals becomes different as a matter of course. The technique to calculate RMS values and phases from AC instantaneous value data is described in a publication titled "Digital Relay Practice Reader", edited by Izumi Mitani, published from OHM Corp., etc.)

Therefore, when such different analog/digital conversion units are present in plural controllers that are objects for the remote control, it will be questionable in the economical efficiency to provide all corresponding electrical quantity data display modules to the display controller as the display controller becomes large in scale. But according to this embodiment, relative program modules are transferred from the protection controllers and are executed only when needed, and therefore, this electric power system protection and control system according to this embodiment is excellent in the economical efficiency.

In this embodiment, the display of electrical quantity is described. This embodiment has the same effect in the same construction in other processes depending on the system configuration and the protection and control system, for instance, the display of substances of system operation etc. Further, by executing program modules in the display controller, load on the CPU of the protection controller can be reduced than when they are executed in the protection controller.

In particular, when requests are sent to the same protection controller from plural display controllers connected to the communication network, if program modules are executed on the protection controller, the process is retarded and sufficient responses may not be obtained. However, in this embodiment, required program modules are moved to respective personal computers (display controllers) for execution, and therefore, it becomes possible to construct an electric power system protection and control system without making the scale of the protection controllers large.

Figure 14:
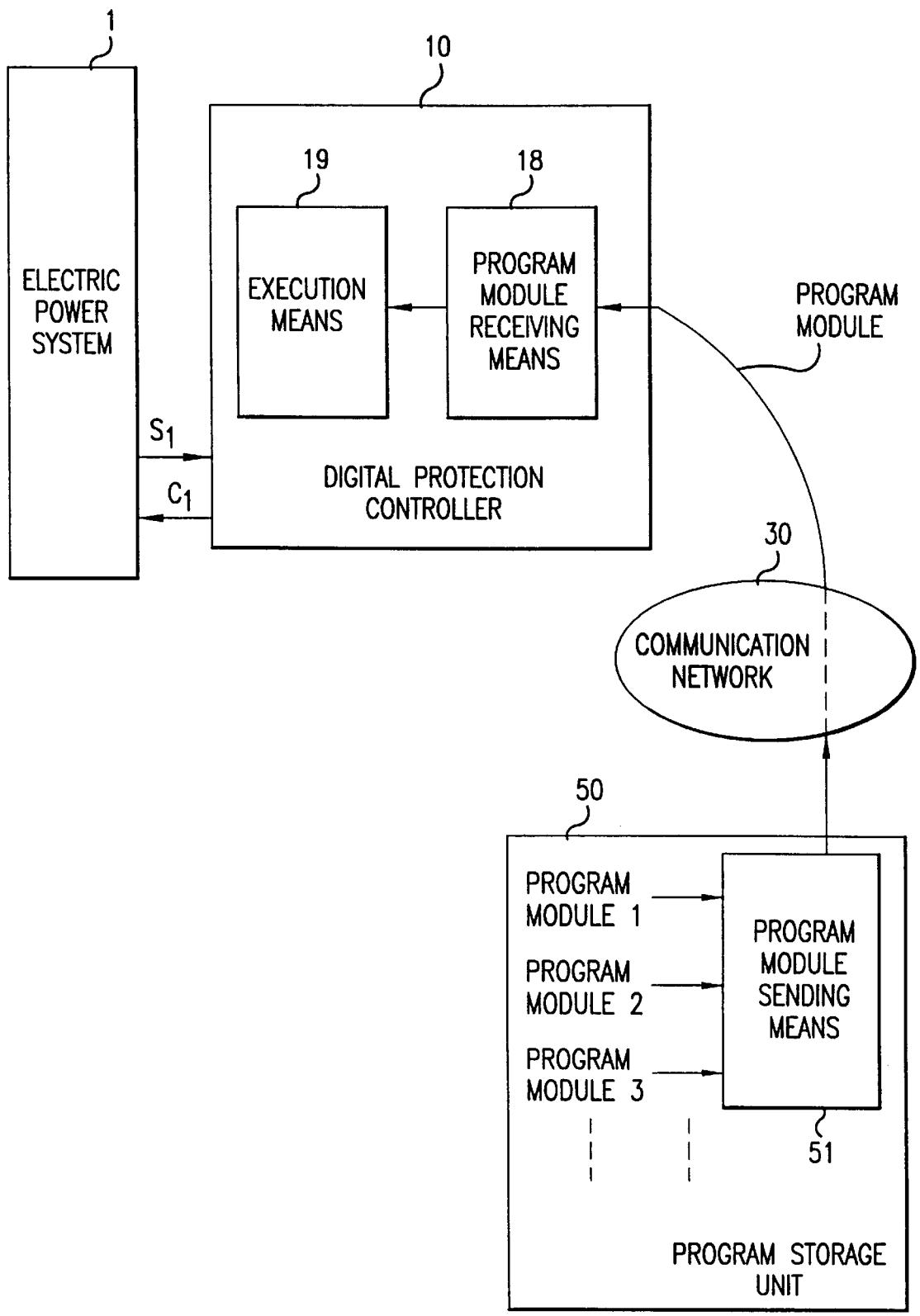
FIG. 14 is a diagram showing the construction of an electric power system protection and control system according to a fifth embodiment of this invention.

FIG. 14 is a block diagram showing the construction of an electric power system protection and control system according to a fifth embodiment of this invention. In FIG. 14, 10 is digital protection controller to perform the protection and control of electric power system 1 by inputting status quantity S1 from electric power system 1 that is an object of protection and control, and is composed of a program module receiving means 18 and an execution means 19. Further, a program storage unit 50 is provided which feeds program modules to digital protection controller 10 via communication network 30 and has a program module sending means 51.

As its operations, according to the program specification of an objective protection controller 10, a required program module is first selected by program module sending means 51 and sent to the protection controller 10 by the designation of operator of program storage unit 50. Protection controller 10 receives and executes this program module.

The definite construction of this embodiment is similar to that of the first embodiment and becomes the system construction shown in FIG. 4. Here, program module sending means 18 is realized by the program written in ROM 2-3 and the received program modules is stored in RAM 2-2. Further, program storage unit 50 is realized by a personal computer or a work station and program module sending means 51 is also realized by the software thereof.

In recent years, the protection controllers are multi-functioned and may include such functions as measurement of the state of electric power system or the fault location, etc. in addition to the protection and control functions. In these cases, all of the functions to be used are so far stored in advance in ROM 2-3 as programs and executed any time. In this embodiment, a form is adopted to supply a required program module from program storage unit 50, when required.

The supplied program module is stored in RAM 2-2 and CPU 2-1 reads out the program module from RAM 2-2 and executes it. For instance, if the measurement of the state of an electric power system is required, a measuring program module is supplied to and executed by protection controller 10. Further, when any fault is taken place, a fault location program module is supplied and executed.

Further, when it becomes necessary to change or add program modules for specification change of functional improvement of the protection controllers, it is necessary to exchange ROM itself, as program modules are stored in ROM 2-3. Therefore, it is so far required to stop the system and perform the ROM exchanging work. As a result, the availability of the system is dropped. But in this embodiment, the change or addition of program modules can be performed easily through the communication network.

According to this embodiment, it becomes possible to add and change functions of the protection controllers easily and efficiently, and further, it is only required to make required functions only resident in the protection controllers. Therefore, it is not required to make the scale of the protection controllers large and it is possible to provide an electric power system protection and control system excellent in economical efficiency, reliability and maintainability.

Figure 15:
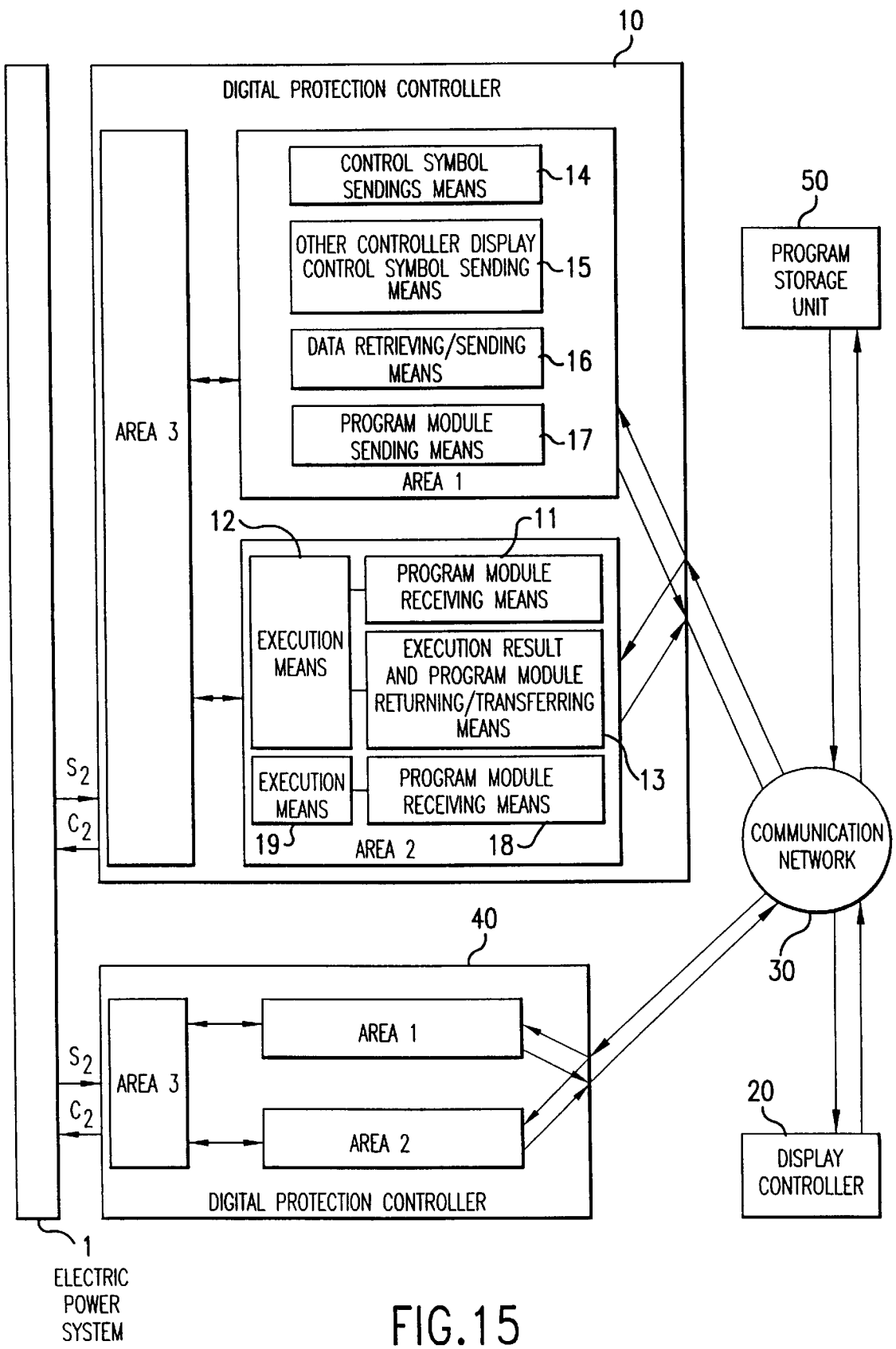
FIG. 15 is a diagram showing the construction of an electric power system protection and control system according to a sixth embodiment of this invention.

FIG. 15 is a block diagram showing the construction of an electric power system protection and control system according to a sixth embodiment of this invention. In FIG. 15, 10 is digital protection controller to perform the protection and control of electric power system 1 by inputting status quantity S1 from electric power system 1 that is an object of protection and control. Digital protection controller 10 is composed of three areas: an area 1 wherein control symbol sending means 14, other controller display control symbol sending means 15, data retrieving/sending means 16 and program module sending means 17 are arranged: an area 2 wherein program module receiving means 11, execution means 12, execution result and program module returning/transferring means 13, program module receiving means 18 and execution means 19 are arranged; and an area 3 to perform the protection and control operation without being directly connected to communication network 30. Here, area 3 composes a core area of protection controller 10, and areas 1 and 2 compose a web area thereof.

Further, display controller 20 performs the remote control of plural controllers including digital protection controllers 10 and 40 in the same construction. Display controller 20 is composed of, though not shown in FIG. 15, program module sending means 21, control symbol interpreting means 22, other controller display control symbol interpreting means 23, program module receiving means 24 and program module executing means 25 corresponding to the plural means of protection controller 10. Further, program storage unit 50 is connected to communication network 30 and has program module sending means 51.

The present embodiment features that as a method of composing the protection controller by combining the first through fifth embodiments, protection controller 10 is divided into three areas described above. In other words, in area 1, information is provided passively to the display controller and the process is not changed in the protection controller. On the other hand, in area 2, information is exchanged positively to/from the display controller, other protection controller and program storage unit and the change and addition of the process in the protection controller are positively performed. Further, area 3 is not directly connected to the communication network and is free from the influence of the communication network.

In case of conventional protection controllers, close connection with other controllers via the communication network is less. On the contrary, the protection controller in this invention is closely connected to other controllers as shown in the first through fifth embodiments. Further, when the protection control operation of an electric power system is compared with the data display process in the protection controller, there is a tendency that the realtime processing is demanded for the former more than the latter. Further, area 2 has a larger memory capacity than other areas, as program modules are often stored in or kept stayed on RAM. It is therefore required to construct the system corresponding to the natures of respective means. This is why three areas are provided that are proposed by this embodiment.

Figure 16:
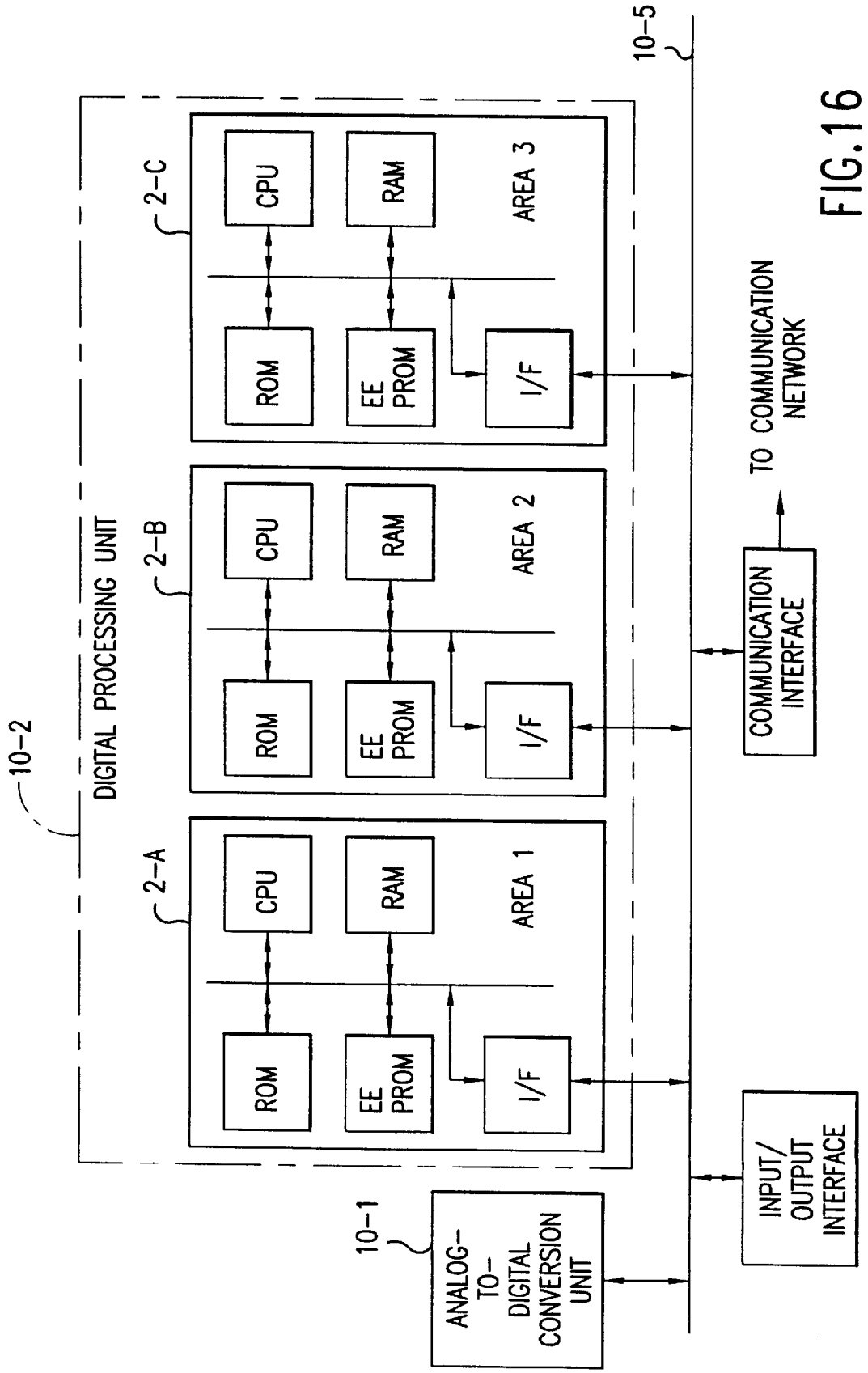
FIG. 16 is a diagram showing an example of the definite construction of the sixth embodiment.

A definite example of the construction of this embodiment is shown in FIG. 16. In FIG. 16, analog/digital conversion unit 10-1, input/output interface 10-3 and communication interface 10-4 are the same as those shown in FIG. 4. This embodiment features that digital processing unit 10-2 is divided into 3 portions. Digital processing units 2-A, 2-B and 2-C are shared to take care the processes of areas 1, 2 and 3, respectively.

As areas 1 and 2 exchange data with communication interface 10-4, digital processing units 2-A and 2-B are in the form capable of being connected to communication network 10-4 in the aspect of both hardware and software. Further, the hardware and software of digital processing unit 2-C are so constructed that it is not connected with communication interface 10-4. Definitely, the connection of each of the processing units with the communication network can be controlled by the contents of programs stored in ROM in each processing unit and the restriction at the interface between each processing unit and the system bus.

As a result of the separation of the hardware into three areas, a program module erroneously coming through the communication network no longer affects the protection control processing unit of area 3 and safety is secured. Further, as all CPUs are separated, a high-speed CPU is used for area 3 where the realtime process is required and low-speed CPUs can be used for the processing units in area 1 and 2, achieving an economical construction. Further, it becomes possible to use a large capacity RAM for area 2 and store program modules.

In FIG. 15, the necessary relation and function between area 2 and area 3 at the minimum is to be able to send and receive the execution result without interfering the operation in the other area.

Furthermore, in addition to the embodiments described above, it is possible that area 3 is provided with the function to respond to the object of the protection and control (such as the electric power system in case of protective relay, and the receiving the money and outputting the vending product in case of vending machine) in real time (within an assured time limit). It is possible that area 2 is provided with the function to execute the program module received from the network surely and safely (concretely, it is judged whether the received program module can be executed or not, and whether it is executed in safe or not). Here, it is not required to execute the program module in area 2 in a real time.

According to this embodiment, it is possible to provide an electric power system protection and control system excellent in reliability and economical efficiency as the safety against the protection control function is secured in spite of the system in which controllers are closely connected to other controllers via the communication network and optimum hardware resources can be allotted to respective means.

Here, it is possible to execute the protection operation in not only in area 3 but also in execution means 12 in area 2. In this case, area 3 takes charge of a main protection function. The function is enough to be fixed in spite of the change in the system, without providing with the flexibility. The protection function is executed in high speed to make the fault spread minimum in any case.

Execution means 12 in area 2 mainly takes charge of a back-up protection function for the purpose of the back-up of area 3. It receives information, such as voltages, currents, breaker state, and generator state, etc. connected to the network. For example, it operates such a signal as to make the effect of the fault in the power plant to the minimum, and sends the signal through the network. In execution means 12, it is good that the processing speed of the protection operation is low. Basically, as the function is for back-up use, it is enough that one program module for back-up protection use is periodically transferred through the network. Accordingly, it is not necessary to store the program module in execution means 12 in area 2 at all times.

Furthermore, execution means 12 in FIGS. 1 and 15 executes the program module sent through communication network 30. In addition, it can send the information, such as status quantity S1 from electric power system 1, to the program module. For example, this information is stored in RAM 2-2 in digital processing unit 10-2, and when the program module is received in execution means 12, execution means 12 sends the information of electric power system 1 to the program module.

Further, it is possible that protection and control output C1 operated in digital processing unit 10-2 is stored temporarily in RAM 2-2, and then sent to the program module.

In FIGS. 1 and 15, as for the program module executed in protection controllers 10, 40, the program module is assumed, such as protective relay operation, control operation, monitoring processing, diagnosis processing, display processing, and analysis processing, etc.

Figure 17:
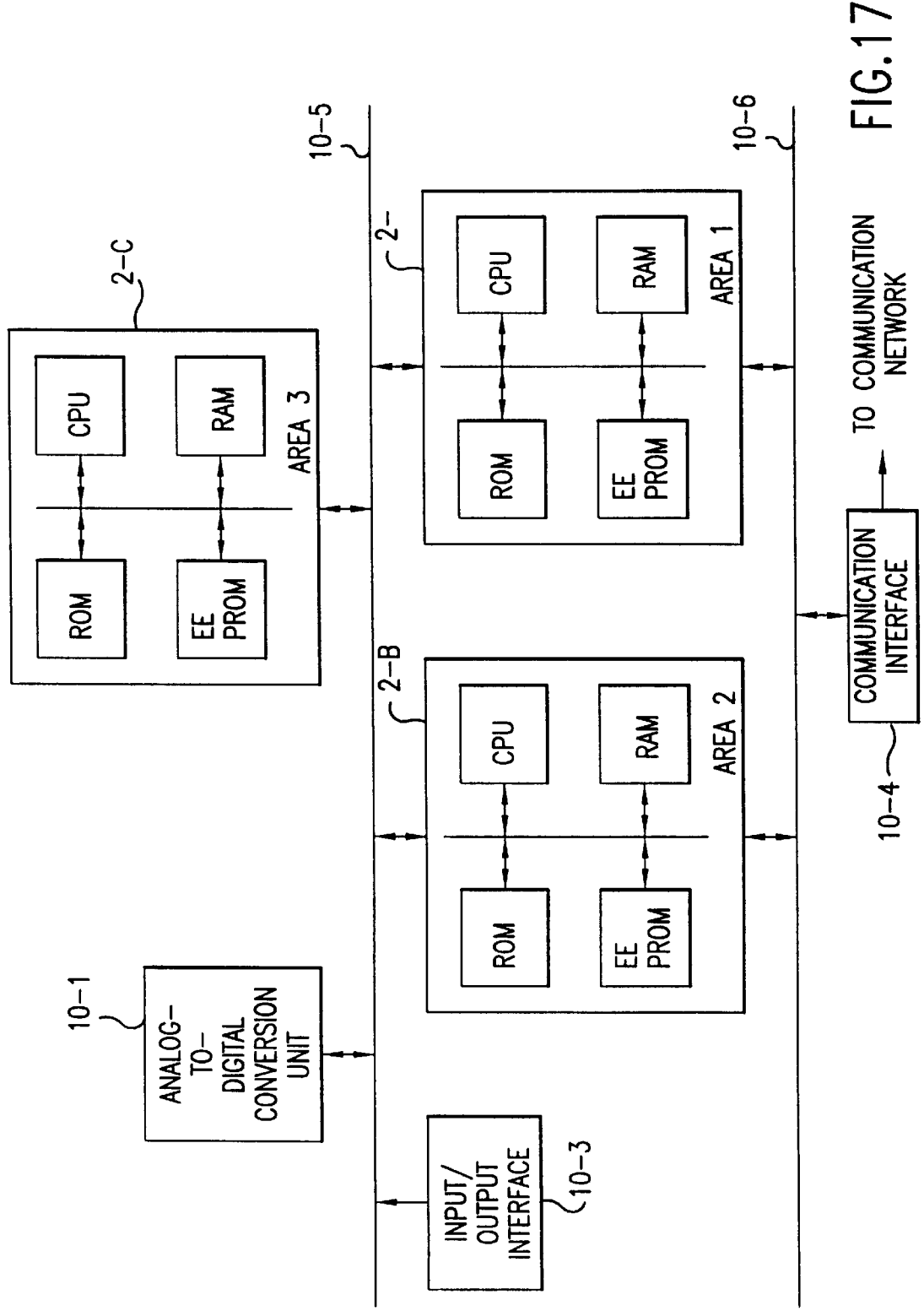
FIG. 17 is a diagram showing another example of the definite construction of the sixth embodiment.

A different construction example of this embodiment is shown in FIG. 17. In FIG. 17, a bus 10-6 is newly added to the construction shown in FIG. 16, and digital processing unit 2-C is completely separated from communication interface 10-4. Digital processing units 2-A and 2-B are connected to both of communication interface 10-4 and digital processing unit 2-C. The effect obtained from this construction is equivalent to that of the construction described above and the explanation is omitted.

Further, this invention is not limited to an electric power system only. But this invention is also applicable to a distributed control system composed of plural distributed controllers to control equipment to be controlled by taking status quantities therefrom and a display controller connected to these distributed controllers via a communication network to display and control for monitoring the operations and status of distributed controllers (or a program storage unit to store program modules that are capable of operating on the distributed controllers). In this case, in the embodiments described above, the protection controllers should be read as the distributed controllers.

In essence, this invention can be applied to a system composed of a plurality of units, each for operating an equipment which is the object to be operated by inputting a status quantity of the equipment, and a display controller connected to each of the units via a communication network for displaying and controlling an operation and status of each of the units for monitoring (or a program storage unit for storing a program module which can be operated in the units).

As described above, according to this invention, it is possible to provide an electric power system protection and control system and a distributed control system which are excellent in the operability, economical efficiency, maintainability and reliability without in creasing the traffic of the communication network, by utilizing the fact that the controllers are connected to the communication network and paying attention to the movement of a program module and the cooperating functions among various controllers in the system.

Obviously, numerous modifications and variations of the present invention are possible in light of the above teachings. It is therefore to be understood that within the scope of the appended claims, the invention may be practiced otherwise than as specifically described herein.

What is claimed is:

1. A monitor and control system, comprising:

a plurality of processing units, each for monitoring or controlling an equipment by inputting a status quantity of said equipment; and a display controller connected to each of said processing units via a communication network, for displaying and controlling an operation and status of each of said processing units for monitoring;

at least one of said processing units including a core area not directly connected to said communication network for executing a predetermined processing to monitor or control said equipment, and a web area for sending and receiving a program module to and from said display controller and another one of said processing units or sending an information in said core area to said program module via said communication network, respectively.

2. An electric power system protection and control system, comprising:

a plurality of protection controllers, each for executing protection and control of an electric power system by inputting a status quantity of said electric power system and for converting said status quantity into digital data; and a display controller connected to each of said protection controllers via a communication network, for displaying and controlling an operation and status of each of said protection controllers for monitoring;

at least one of said protection controllers including a core area not directly connected to said communication network for executing said protection and control of said electric power system, and a web area for sending and receiving a program module to and from said display controller and another one of said protection controllers or sending an information in said core area to said program module via said communication network, respectively.

3. The electric power system protection and control system according to claim 2:

wherein said display controller is provided with program module sending means for sending out said program module corresponding to contents for display control in said display controller to each of said protection controllers via said communication network; and wherein at least one of said protection controllers is provided with in said web area, program module receiving means for receiving said program module from said display controller or another one of said protection controllers, executing means for executing said received program module, and transfer means for transferring an execution result by said execution means or said program module stored in said protection controller to said display controller or another one of said protection controllers via said communication network.

4. The electric power system protection and control system according to claim 2:

wherein said display controller is provided with program module sending means for sending out said program module corresponding to contents for display control in said display controller to each of said protection controllers via said communication network; and wherein at least one of said protection controllers is provided with in said web area, program module receiving means for receiving said program module from said display controller or another one of said protection controllers, executing means for giving said information in said core area to said received program module, and transfer means for transferring an execution result by said execution means or said program module stored in said protection controller to said display controller or another one of said protection controllers via said communication network.

5. The electric power system protection and control system according to claim 2:

wherein said display controller is provided with program module sending means for sending out said program module corresponding to contents for display control in said display controller to one of said protection controllers, respectively; and wherein at least one of said protection controllers is provided with in said web area, program module receiving means for receiving said program module from said display controller or another one of said protection controllers via said communication network, execution means for executing said received program module, and transfer means for transferring an execution result by said execution means or said program module stored in said protection controller to said display controller or another one of said protection controllers via said communication network.

6. The electric power system protection and control system according to claim 2:

wherein at least one of said protection controllers is provided with in said web area, control symbol sending means for sending out a control symbol to control a layout structure of a display picture of said display controller together with data expressing said operation and status of said protection controller; and wherein said display controller is provided with control symbol interpreting means for interpreting said control symbol sent from said control symbol sending means and for displaying said data in said layout structure determined by said control symbol sending means.

7. The electric power system protection and control system according to claim 6:

wherein at least one of said protection controllers is further provided with in said web area, other controller display control symbol sending means for sending out said control symbol for displaying data of another one of said protection controllers, and data retrieval/sending means for retrieving said data of said protection controller according to other controller display request from said display controller and for sending out said retrieved data to said display controller; and wherein said display controller is provided with, other controller display control symbol interpreting means for interpreting said control symbol sent from said other controller display control symbol sending means and for sending to another one of said protection controllers a data sending request according to an interpretation result, and other controller data sending means for sending out data of another one of said protection controllers determined from said data retrieval/sending means in said protection controller to said protection controller which has requested said data.

8. The electric power system protection and control system according to claim 2:

wherein at least one of said protection controllers is provided with in said web area, program module sending means for sending out said program module corresponding to contents for display control in said display controller to said display controller via said communication network; and wherein said display controller is provided with, receiving means for receiving said program module from said program module sending means, and program module executing means for executing said received program module.

9. The electric power system protection and control system according to claim 2, further comprising:

a program storage device provided with program module sending means for supplying said program module corresponding to contents for display control in said display controller to one of said protection controllers via said communication network;

wherein at least one of said protection controllers is provided with in said web area, receiving means for receiving said program module from said program module sending means, and execution means for executing said received program module.

10. The electric power system protection and control system according to claim 2, further comprising:

a program storage device for storing said program module corresponding to contents for display control in said display controller to one of said protection controllers via said communication network;

wherein at least one of said protection controllers is provided with in said web area, an area 1 for providing an information passively to said display controller and an area 2 for sending and receiving said information actively to and from said display controller, one of said protection controllers and said program storage device, said area 1 including, control symbol sending means for sending out a control symbol to control a layout structure of a display picture of said display controller to display and change data in one of said protection controllers together with data expressing said operation and status of said protection controller, other controller display control symbol sending means for sending out said control symbol to display data of another one of said protection controllers in said display picture, data retrieval/sending means for retrieving said data of said protection controller according to other controller display request from said display controller and for sending out said retrieved data to said display controller, and program module sending means for sending out said program module corresponding to contents for display control in said display controller to said display controller via said communication network, and said area 2 including, program module receiving means for receiving said program module from said display controller, execution means for executing said received program module, execution result and program module returning/transferring means for transferring an execution result by said execution means or said program module stored in said protection controller to said display controller, receiving means for receiving said program module from said program module sending means provided in said display controller, and execution means for executing said received program module.

11. A distributed control system, comprising:

a plurality of distributed controllers, each for controlling an equipment to be controlled by inputting a status quantity of said equipment and for converting said status quantity into digital data; and a display controller connected to each of said distributed controllers via a communication network, for displaying and controlling an operation and status of each of said distributed controllers for monitoring;

at least one of said distributed controllers including a core area not directly connected to said communication network for controlling said equipment, and a web area for sending and receiving a program module to and from said display controller and another one of said distributed controllers or sending an information in said core area to said program module via said communication network, respectively.

12. The distributed control system according to claim 11:

wherein said display controller is provided with program module sending means for sending out said program module corresponding to contents for display control in said display controller to each of said distributed controllers via said communication network; and wherein at least one of said distributed controllers is provided with in said web area, program module receiving means for receiving said program module from said display controller or another one of said distribution controllers, executing means for executing said received program module, and transfer means for transferring an execution result by said execution means or said program module stored in said distributed controller to said display controller or another one of said distributed controllers via said communication network.

13. A program storing medium readable by a computer, tangibly embodying a program of instructions executable by said computer to perform method steps for a monitor and control system including a plurality of processing units, each configured to perform at least one of monitoring and controlling an equipment by inputting a status quantity of said equipment, and a display controller connected to each of said processing units via a communication network and configured to display and control an operation and status of each of said processing units, at least one of said processing units including a first area not directly connected to said communication network and a second area, said method comprising the steps of:

an executing step for executing a predetermined processing to monitor or control said equipment, in a processing unit at said first area; and a step for performing at least one of (1) sending and receiving a program module to and from said display controller and another one of said processing units and (2) sending an information in said first area to said program module via said communication network, respectively, at said second area.

14. A program storing medium readable by a computer, tangibly embodying a program of instructions executable by said computer to perform method steps for an electric power system protection and control system including a plurality of protection controllers, each configured to execute protection and control of an electric power system by inputting a status quantity of said electric power system and to convert said status quantity into digital data, and a display controller connected to each of said protection controllers via a communication network and configured to display and control an operation and status of each of said protection controllers, at least one of said protection controllers including a first area not directly connected to said communication network and a second area, said method comprising the steps of:

an executing step for executing said protection and control of said electric power system, at said first area; and a step for performing at least one of (1) sending and receiving a program module to and from said display controller and another one of said protection controllers and (2) sending an information in said first area to said program module via said communication network, respectively, at said second area.

15. The program storing medium according to claim 14, wherein said method further comprises the steps of:

a program module sending step for sending out said program module corresponding to contents for display control in said display controller to at least one of said protection controllers via said communication network, at said display controller; and a program module receiving step for receiving said program module from at least one of said display controller and another one of said protection controllers, at said second area;

an executing step for executing said received program module, at said second area; and a transfer step for transferring at least one of an execution result by said executing step and said program module stored in said protection controller to at least one of said display controller and another one of said protection controllers via said communication network, at said second area.

16. A program storing medium readable by a computer, tangibly embodying a program of instructions executable by said computer to perform method steps for a distributed control system including a plurality of distributed controllers, each configured to control an equipment to be controlled by inputting a status quantity of said equipment and to convert said status quantity into digital data, and a display controller connected to each of said distributed controllers via a communication network and configured to display and control an operation and status of each of said distributed controllers, at least one of said distributed controllers including a first area not directly connected to said communication network and a second area, said method comprising the steps of:

a step for controlling said equipment, at said first area; and a step for performing at least one of (1) sending and receiving a program module to and from said display controller and another one of said distributed controllers and (2) sending an information in said first area to said program module via said communication network, respectively, at said second area.

17. The program storing medium according to claim 16, further comprising the steps of:

a program module sending step for sending out said program module corresponding to contents for display control in said display controller to each of said distributed controllers via said communication network, at said display controller;

a program module receiving step for receiving said program module from said display controller or another one of said distribution controllers, at said second area;

an executing step for executing said received program module, at said second area; and a transfer step for transferring an execution result by said execution means or said program module stored in said distributed controller to said display controller or another one of said distributed controllers via said communication network, at said second area.

18. A monitor and control device, comprising:

a plurality of processing units, each for monitoring or controlling an equipment by inputting a status quantity of said equipment; and a display controller connected to each of said processing units via a communication network, for displaying and controlling an operation and status of each of said processing units for monitoring;

at least one of said processing units including a core area not directly connected to said communication network for executing a predetermined processing to monitor or control said equipment, and a web area for sending and receiving a program module to and from said display controller and another one of said processing units or sending an information in said core area to said program module via said communication network, respectively.

19. An electric power system protection and control device, comprising:

a plurality of protection controllers, each for executing protection and control of an electric power system by inputting a status quantity of said electric power system and for converting said status quantity into digital data; and a display controller connected to each of said protection controllers via a communication network, for displaying and controlling an operation and status of each of said protection controllers for monitoring;

at least one of said protection controllers including a core area not directly connected to said communication network for executing said protection and control of said electric power system, and a web area for sending and receiving a program module to and from said display controller and another one of said protection controllers or sending an information in said core area to said program module via said communication network, respectively.

20. The electric power system protection and control device according to claim 19:

wherein said display controller is provided with a program module sending unit for sending out said program module corresponding to contents for display control in said display controller to each of said protection controllers via said communication network; and wherein at least one of said protection controllers is provided with in said web area, a program module receiving unit for receiving said program module from said display controller or another one of said protection controllers, an executing unit for executing said received program module, and a transfer unit for transferring an execution result by said execution unit or said program module stored in said protection controller to said display controller or another one of said protection controllers via said communication network.

21. The electric power system protection and control device according to claim 19:

wherein at least one of said protection controllers comprises, in said web area, a control symbol sending unit configured to send out a control symbol to control a layout structure of a display picture of said display controller together with data expressing said operation and status of said protection controller; and wherein said display controller comprises a control symbol interpreting unit configured to interpret said control symbol sent from said control symbol sending unit and to display said data in said layout structure determined by said control symbol sending unit.

22. The electric power system protection and control device according to claim 21:

wherein at least one of said protection controllers, in said web area, further comprises, an other controller display control symbol sending unit configured to send out said control symbol for displaying data of another one of said protection controllers, and a data retrieval/sending unit configured to retrieve said data of said protection controller according to an other controller display request from said display controller and for sending out said retrieved data to said display controller; and wherein said display controller comprises, an other controller display control symbol interpreting unit configured to interpret said control symbol sent from said other controller display control symbol sending unit and for sending to another one of said protection controllers a data sending request according to an interpretation result, and an other controller data sending unit configured to send out data of another one of said protection controllers determined from said data retrieval/sending unit in said protection controller to said protection controller which has requested said data.

23. The electric power system protection and control device according to claim 19:

wherein at least one of said protection controllers comprises, in said web area, a program module sending unit configured to send out said program module corresponding to contents for display control in said display controller to said display controller via said communication network; and wherein said display controller comprises,
  a receiving unit configured to receive said program module from said program module sending unit, and
  a program module executing unit configured to execute said received program module.

24. The electric power system protection and control device according to claim 19, further comprising:
  a program storage device provided with a program module sending unit configured to supply said program module corresponding to contents for display control in said display controller to one of said protection controllers via said communication network;
  wherein at least one of said protection controllers comprises, in said web area,
  a receiving unit configured to receive said program module from said program module sending unit, and
  an execution unit configured to execute said received program module.

25. The electric power system protection and control device according to claim 19, further comprising:
  a program storage device configured to store said program module corresponding to contents for display control in said display controller to one of said protection controllers via said communication network;
  wherein at least one of said protection controllers comprises, in said web area, an area 1 configured to provide an information passively to said display controller and an area 2 configured to send and receive said information actively to and from said display controller, one of said protection controllers and said program storage device,
  said area 1 including,
    a control symbol sending unit configured to send out a control symbol to control a layout structure of a display picture of said display controller to display and change data in one of said protection controllers together with data expressing said operation and status of said protection controller,
    an other controller display control symbol sending unit configured to send out said control symbol to display data of another one of said protection controllers in said display picture,
    a data retrieval/sending unit configured to retrieve said data of said protection controller according to other controller display request from said display controller and to send out said retrieved data to said display controller, and
    a program module sending unit configured to send out said program module corresponding to contents for display control in said display controller to said display controller via said communication network, and
  said area 2 including,
    a program module receiving unit configured to receive said program module from said display controller,
    an execution unit configured to execute said received program module,
    an execution result and program module returning/transferring unit configured to transfer an execution result by said execution unit or said program module stored in said protection controller to said display controller,
    a receiving unit configured to receive said program module from said program module sending unit provided in said display controller, and
  an execution unit configured to execute said received program module.

26. A distributed control device, comprising:
  a plurality of distributed controllers, each for controlling an equipment to be controlled by inputting a status quantity of said equipment and for converting said status quantity into digital data; and
  a display controller connected to each of said distributed controllers via a communication network, for displaying and controlling an operation and status of each of said distributed controllers for monitoring;
  at least one of said distributed controllers including a core area not directly connected to said communication network for control of said equipment, and a web area for sending and receiving a program module to and from said display controller and another one of said distributed controllers or sending an information in said core area to said program module via said communication network, respectively.

27. The distributed control device according to claim 26:
  wherein said display controller is provided with a program module sending unit for sending out said program module corresponding to contents for display control in said display controller to each of said distributed controllers via said communication network; and
  wherein at least one of said distributed controllers is provided with in said web area,
  a program module receiving unit for receiving said program module from said display controller or another one of said distribution controllers,
  an executing unit for executing said received program module, and
  a transfer unit for transferring an execution result by said execution unit or said program module stored in said distributed controller to said display controller or another one of said distributed controllers via said communication network.

* * * * *